United States Patent
Zamfir et al.

(10) Patent No.: US 8,966,453 B1
(45) Date of Patent: Feb. 24, 2015

(54) AUTOMATIC GENERATION OF PROGRAM EXECUTION THAT REACHES A GIVEN FAILURE POINT

(75) Inventors: Cristian Zamfir, Prilly (CH); George Candea, Saint-Sulpice (CH)

(73) Assignee: Ecole Polytechnique Fédérale de Lausanne, Lausanne (CH)

( * ) Notice: Subject to any disclaimer, the term of this patent is extended or adjusted under 35 U.S.C. 154(b) by 662 days.

(21) Appl. No.: 13/304,041

(22) Filed: Nov. 23, 2011

Related U.S. Application Data

(60) Provisional application No. 61/416,765, filed on Nov. 24, 2010.

(51) Int. Cl.
G06F 9/45 (2006.01)

(52) U.S. Cl.
USPC ................ 717/130; 717/124; 714/38.1

(58) Field of Classification Search
None
See application file for complete search history.

(56) References Cited

U.S. PATENT DOCUMENTS

| | | | | |
|---|---|---|---|---|
| 2009/0132861 A1* | 5/2009 | Costa et al. | ...................... | 714/45 |
| 2009/0199161 A1* | 8/2009 | Cutler | ........................... | 717/124 |
| 2011/0078666 A1* | 3/2011 | Altekar | ......................... | 717/131 |

OTHER PUBLICATIONS

Manevich et al. "PSE: Explaining Program Failures via Postmortem Static Analysis", 2004, Proceedings of the 12th ACM SIGSOFT twelfth international symposium on Foundations of software engineering, pp. 63-72.*

Wang et al. "An Approach to Detecting Duplicate Bug Reports using Natural Language and Execution Information", 2008, Proceedings of the 30th international conference on Software engineering, pp. 461-470.*

Xie et al., "Fitness-Guided Path Exploration in Dynamic Symbolic Execution", 2009, IEEE/IFIP International Conference on Dependable Systems & Networks (DSN '09), pp. 359-368.*

Aho, A.V., et al., "Compilers: principles, techniques, and tools," $2^{nd}$ Ed., Pearson Education, Inc., Boston, MA, USA, 2007, (cover and title page only).

Altekar, G., et al., "ODR: Output-deterministic replay for multicore debugging," In Symp. on Operating Systems Principles, Oct. 11-14, 2009, Big Sky, Montana, USA, 14 Pages.

Boonstoppel, P., et al., "RWset: Attacking path explosion in constraint-based test generation," In Tools and Algorithms for the Construction and Analysis of Systems, 2008, 16 Pages.

Brumley, D., et al., "Automatic patch-based exploit generation is possible: Techniques and implications," In IEEE Symp. on Security and Privacy, 2008, 15 Pages.

Brumley, D., et al., "Creating vulnerability signatures using weakest preconditions," In Computer Security Foundations Symp., 2007, 15 Pages.

Cadar, C., et al., "KLEE: Unassisted and automatic generation of high-coverage tests for complex systems programs," In Symp. on Operating Systems Design and Implementation, 2008, 14 Pages.

(Continued)

*Primary Examiner* — Jue Louie
(74) *Attorney, Agent, or Firm* — Fenwick & West LLP

(57) ABSTRACT

An execution of a target software program that causes a particular bug to manifest itself is generated. A target software program is received. A bug report generated by an execution of the target software program is received. The bug report describes a particular bug within the target software program. A bug type of the particular bug is received. A synthesized execution file is generated based on the target software program, the bug report, and the bug type. The synthesized execution file specifies an execution of the target software program that causes the particular bug to manifest itself.

17 Claims, 9 Drawing Sheets

(56) References Cited

OTHER PUBLICATIONS

Castro, M., et al., "Better bug reporting with better privacy," in Intl. Conf. on Architectural Support for Programming Languages and Operating Systems, Mar. 1-5, 2008, Seattle, Washington, USA, pp. 319-328.
Chipounov, V., et al., "Selective symbolic execution," In Proceedings of the 5th Workshop on Hot Topics in System Dependability (HotDep), Lisbon, Portugal, Jun. 2009, 6 Pages.
Chow, J., et al., "Decoupling dynamic program analysis from execution in virtual environments," In USENIX Annual Technical Conf., 2008, pp. 1-14.
Costa, M., et al., "Bouncer: Securing software by blocking bad input," In Symp. on Operating Systems Principles, Oct. 14-17, 2007, Stevenson, Washington, USA, 14 Pages.
Costa, M., et al., "Vigilante: End-to-end containment of Internet worms," In Symp. on Operating Systems Principles, Oct. 23-26, 2005, Brighton, UK, 15 Pages.
Dunlap, G.W., et al., "Execution replay for multiprocessor virtual machines," In Intl. Conf. on Virtual Execution Environments, Mar. 5-7, 2008, Seattle, Washington, USA, 10 Pages.
Dunlap, G.W., et al., "ReVirt: Enabling intrusion analysis through virtual-machine logging and replay," In Symp. on Operating Systems Design and Implementation, 2002, 14 Pages.
Engler, D., et al., "RacerX: Effective, static detection of race conditions and deadlocks," In Symp. on Operating Systems Principles, 2003, 16 Pages.
Glerum, K., et al., "Debugging in the (very) large: ten years of implementation and experience," In Symp. on Operating Systems Principles, Oct. 11-14, 2009, Big Sky, Montana, USA, pp. 1-17.
Godefroid, P., et al., "Automated Whitebox Fuzz Testing," In Network and Distributed System Security Symp., 2008, 16 Pages.
Godefroid, P., et al., "Concurrency at Microsoft—An exploratory survey," In CAV Workshop on Exploiting Concurrency Efficiently and Correctly, 2008, 4 Pages.
Godefroid, P., et al., "DART: Directed automated random testing," In Conf. on Programming Language Design and Implementation, Jun. 12-15, 2005, Chicago, Illinois, USA, 11 Pages.
Guo, Z., et al., "R2: An application-level kernel for record and replay," 8th USENIX Symposium on Operating Systems Design and Implementation, 2008, pp. 193-208.
Intel, "Section 17.2: Debug Registers," Intel Architecture Software Developer's Manual, vol. 2: Instruction Set Reference. 1999, pp. 17-2 to 17-9, vol. 3B.
Joshi, P., et al., "A randomized dynamic program analysis technique for detecting real deadlocks," In Conf. on Programming Language Design and Implementation, Jan. 12, 2009, pp. 1-10.
Jula, H., et al., "Deadlock immunity: Enabling systems to defend against deadlocks," 8th USENIX Symposium on Operating Systems Design and Implementation, 2008, pp. 295-308.
King, J.C., "Symbolic execution and program testing," Communications of the ACM, Jul. 1976, pp. 385-394, vol. 19, No. 7.
King, S.T., et al., "Debugging operating systems with time-traveling virtual machines," In USENIX Annual Technical Conf., 2005, pp. 1-15.
Lamport, L. "Time, clocks, and the ordering of events in a distributed system," Communications of the ACM, Jul. 1978, pp. 558-565, vol. 21, No. 7.
Lattner, C., et al., "LLVM: A compilation framework for lifelong program analysis and transformation," In Proceedings of the International Symposium on Code Generation and Optimization (CGO 2004), IEEE, 2004, 12 Pages.
Lu, S., et al., "Learning from mistakes—a comprehensive study on real world concurrency bug characteristics," In Intl. Conf. on Architectural Support for Programming Languages and Operating Systems, Mar. 1-5, 2008, Seattle, Washington, USA, 11 Pages.
Luk, C.-K., et al., "PIN: building customized program analysis tools with dynamic instrumentation," In Conf. on Programming Language Design and Implementation, Jun. 12-15, 2005, Chicago, Illinois, USA, pp. 1-11.
Marinescu, P.D., et al., "An extensible technique for high-precision testing of recovery code," In USENIX Annual Technical Conf., Boston, Massachusetts, USA, Jun. 2010, 14 Pages.
Musuvathi, M., et al., "Finding and reproducing Heisenbugs in concurrent programs," 8th USENIX Symposium on Operating Systems Design and Implementation, 2008, pp. 267-280.
Narayanasamy, S., et al., "Automatically classifying benign and harmful data races using replay analysis," Conf. on Programming Language Design and Implementation, Jun. 11-13, 2007, San Diego, California, USA, 11 Pages.
National Institute of Standards and Technology, "Secure hash standard (SHS)," FIPS PUB 180-3, Information Technology Laboratory, National Institute of Standards and Technology, Oct. 2008, pp. i-v, 1-27.
Ohloh, "SQLite," Source code collected on Nov. 24, 2009, 1 Page, [online] [Retrieved on Jan. 23, 2012] Retrieved from the internet <URL: https://www.ohloh.net/p/sqlite/analyses/1784359>.
Park, S., et al., "PRES: Probabilistic replay with execution sketching on multiprocessors," Symposium on Operating Systems Principles, Oct. 11-14, 2009, Big Sky, Montana, USA, 15 Pages.
Savage, S., et al., "Eraser: a dynamic data race detector for multithreaded programs," ACM Transactions on Computer Systems, Nov. 1997, pp. 391-411, vol. 15, No. 4.
Securityfocus, "Ghttpd Log( ) Function Buffer Overflow Vulnerability," 2010, 1 Page, [online] [Retrieved on Jan. 20, 2012] Retrieved from the internet <URL: http://www.securityfocus.com/bid/5960>.
Sen, K., "Race directed random testing of concurrent programs," Conf. on Programming Language Design and Implementation, Jun. 7-13, 2008, Tucson, Arizona, USA, pp. 11-21.
Sqlite, Webpage for http://www.sqlite.org/, 2010, 2 pages, [online] [Retrieved on Jan. 20, 2012] Retrieved from the internet <URL: http://www.sqlite.org/>.
Weiser, M., "Program slicing," In Intl. Conf. on Software Engineering, IEEE, 1981, pp. 439-449.
Xin, B., et al., "Efficient program execution indexing," In Conf. on Programming Language Design and Implementation, Jun. 7-13, 2008, Tucson, Arizona, USA, 11 Pages.
Xu, M., et al., "A "flight data recorder" for enabling full-system multiprocessor deterministic replay," International Symposium on Computer Architecture, 2003, 12 Pages.
Yuan, D., et al., "SherLog: error diagnosis by connecting clues from run-time logs," In Intl. Conf. on Architectural Support for Programming Languages and Operating Systems, Mar. 13-17, 2010, Pittsburgh, Pennsylvania, USA, 12 Pages.
Zamfir, C., et al., "Execution Synthesis: A Technique for Automated Software Debugging," In ACM SIGOPS/EuroSys European Conf. on Computer Systems, Apr. 13-16, 2010, Paris, France, ACM, 14 Pages.
Zamfir, C., et al., "Low-Overhead Bug Fingerprinting for Fast Debugging," Proceedings of the Intl. Conference on Runtime Verification, Malta, Nov. 2010, 8 Pages.

\* cited by examiner

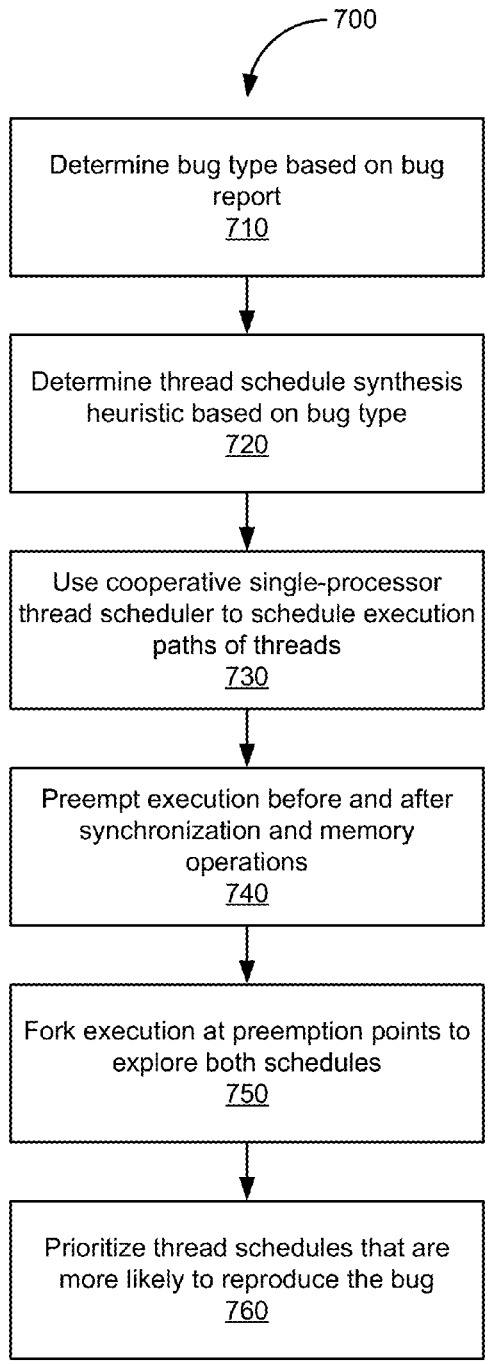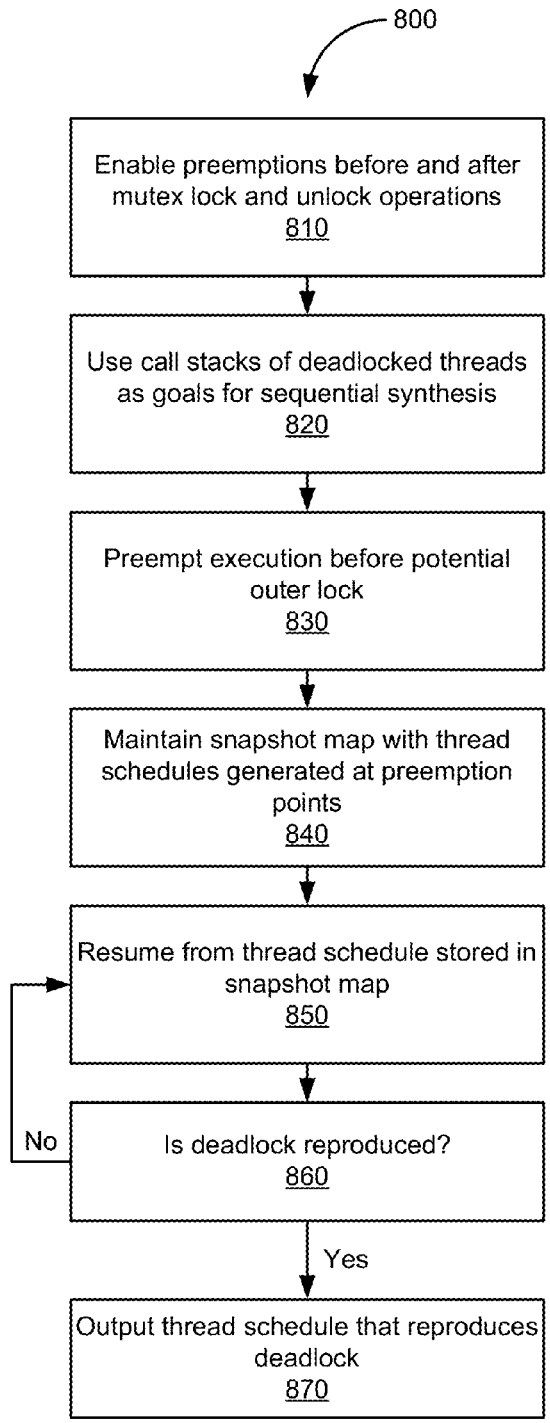
FIG. 7
FIG. 8

```
            ...
            idx=0;
1:          if (getchar() == 'm')
2:             idx++;
3:          if (getenv("mode")[0] == 'Y')
4:             mode=MOD_Y;
5:          else
6:             mode=MOD_Z;
            ...
7:          CriticalSection() {
8:             lock(M1);
9:             lock(M2);
               ...
10:            if (mode==MOD_Y && idx==1) {
11:               unlock(M1);
                  ...
12:               lock(M1);
               }
            ...
```

Algorithm 1: Heuristic Proximity to Goal (Simplified)

Input: Execution state $S$, goal $G$ (potentially intermediate)
Output: Estimate of $S$'s distance to $G$ 1   $d_{min} \leftarrow distance(S.pc, G)$
2   if $d_{min} = \infty$ then
3      foreach *procedure* $\pi \in S.callStack$ do
4          $I_{ra} \leftarrow$ instruction to be executed after $\pi$ call returns
5          $d \leftarrow dist2ret(S.pc) + distance(I_{ra}, G) + 1$
6          $d_{min} \leftarrow \min(d_{min}, d)$ 7   return $d_{min}$ 8   function *distance* ( instruction $I$, instruction $G$ )
9     $d_{min} \leftarrow \infty$
10   if *$I$ and $G$ are in the same procedure* $\pi$ then
11      foreach *acyclic path $\rho$ in $\pi$'s CFG from $I$ to $G$* do
12          $d \leftarrow$ number of instructions on path $\rho$
13          foreach *call to procedure $\gamma$ along path $\rho$* do
14              $d \leftarrow d + dist2ret(\gamma.startInstruction)$
15          $d_{min} \leftarrow \min(d_{min}, d)$ 16   return $d_{min}$ 17   function *dist2ret* ( instruction $I$ )
18   $d_{min} \leftarrow \infty$
19   $\pi \leftarrow$ procedure to which $I$ belongs
20   foreach *return instruction $R$ in $\pi$* do
21      $d_{min} \leftarrow \min(d_{min}, distance(I, R))$
22   return $d_{min}$

FIG. 12

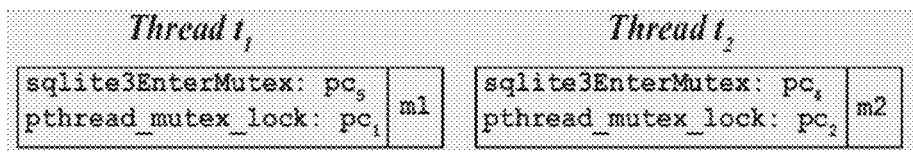
FIG. 13A
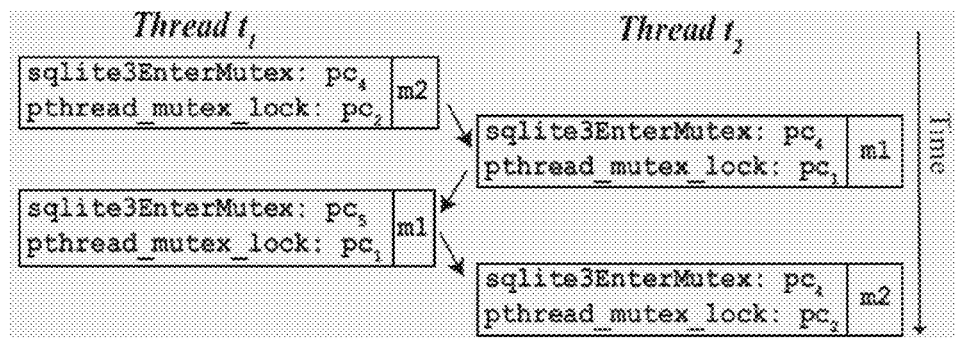
FIG. 13B
FIG. 13C

AUTOMATIC GENERATION OF PROGRAM EXECUTION THAT REACHES A GIVEN FAILURE POINT

RELATED APPLICATION

This application claims the benefit of U.S. Provisional Application No. 61/416,765, filed on Nov. 24, 2010, entitled "Execution Synthesis: A Technique for Automated Software Debugging."

BACKGROUND

1. Technical Field

The invention generally relates to the field of software testing and debugging and in particular to a generating an execution of a program that reaches a given failure point (e.g., a "bug").

2. Background Information

Many techniques exist for finding errors ("bugs") in software programs. One technique is to reproduce the bug by executing the program in such a way that the bug deterministically manifests itself. The program's execution can then be played back and observed in a debugger. The debugger enables a software developer to observe the buggy behavior and use traditional techniques to find the bug, such as step-by-step execution and data structure dumps. Before a program can be executed in such a way that a bug deterministically manifests itself, it is necessary to determine how to force the program to arrive at the relevant failure point. This is difficult to do.

SUMMARY

The above and other issues are addressed by a computer-implemented method, non-transitory computer-readable storage medium, and computer system for generating an execution of a target software program that causes a particular bug to manifest itself. An embodiment of the method comprises receiving a target software program. The method further comprises receiving a bug report generated by an execution of the target software program. The bug report describes a particular bug within the target software program. The method further comprises receiving a bug type of the particular bug and generating a synthesized execution file based on the target software program, the bug report, and the bug type. The synthesized execution file specifies an execution of the target software program that causes the particular bug to manifest itself.

An embodiment of the medium stores executable computer program instructions for generating an execution of a target software program that causes a particular bug to manifest itself. The instructions receive a target software program. The instructions further receive a bug report generated by an execution of the target software program. The bug report describes a particular bug within the target software program. The instructions further receive a bug type of the particular bug and generate a synthesized execution file based on the target software program, the bug report, and the bug type. The synthesized execution file specifies an execution of the target software program that causes the particular bug to manifest itself.

An embodiment of the computer system for generating an execution of a target software program that causes a particular bug to manifest itself comprises at least one non-transitory computer-readable storage medium storing executable computer program instructions. The instructions comprise instructions for receiving a target software program. The instructions further receive a bug report generated by an execution of the target software program. The bug report describes a particular bug within the target software program. The instructions further receive a bug type of the particular bug and generate a synthesized execution file based on the target software program, the bug report, and the bug type. The synthesized execution file specifies an execution of the target software program that causes the particular bug to manifest itself.

BRIEF DESCRIPTION OF THE DRAWINGS

FIG. 7 is a flowchart illustrating a method of determining a schedule for interleaving the execution paths of individual threads for a generic bug according to one embodiment.

FIG. 8 is a flowchart illustrating a method of determining a schedule for interleaving the execution paths of individual threads for a deadlock bug according to one embodiment.

FIG. 12 is a listing of pseudocode illustrating a simplified heuristic proximity to goal according to one embodiment.

FIG. 13A is a listing of pseudocode illustrating the global mutex implementation in SQLite.

FIG. 13B is a bug report corresponding to the listing of pseudocode in FIG. 13A.

FIG. 13C is a deadlock fingerprint corresponding to the listing of pseudocode in FIG. 13A according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
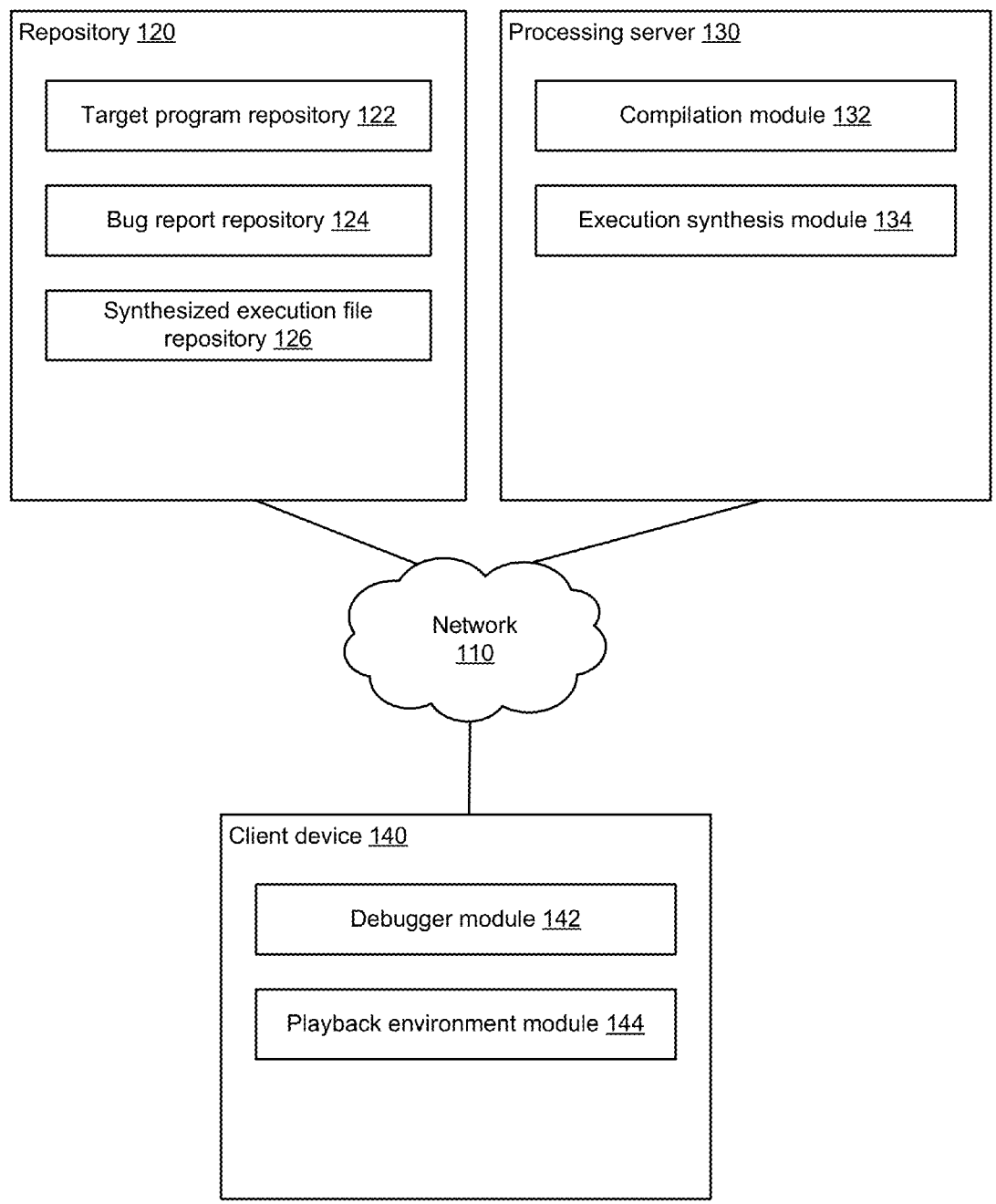
FIG. 1 is a high-level block diagram illustrating an environment for generating a program execution that reaches a given failure point according to one embodiment.

FIG. 1 is a high-level block diagram illustrating an environment 100 for generating an execution of a software program that reaches a given failure point (e.g., a "bug") according to one embodiment. The environment 100 may be maintained by an enterprise that facilitates software testing and/or debugging, such as a corporation, university, or government agency. As shown, the environment 100 includes a network 110, a repository 120, a processing server 130, and a client device 140. While only one of each entity is shown in the embodiment depicted in FIG. 1 for clarity, other embodiments can have multiple repositories 120, processing servers 130, and/or client devices 140.

The network 110 represents the communication pathway between the repository 120, the processing server 130, and the client device 140. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above. Custom and/or dedicated data communications technologies include, for example, shared storage (e.g., a shared storage server), a cloud-based server, and a bug database.

The repository 120 is a computer (or set of computers) that stores a target program repository 122, a bug report repository 124, and a synthesized execution file repository 126. In one embodiment, the repository 120 includes a server that provides the processing server 130 access to the target program repository 122, bug report repository 124, and synthesized execution file repository 126 in response to requests.

The target program repository 122 stores one or more software programs (referred to as "target programs"). The environment 100 enables the generation of an execution of a target program that reaches a given failure point (e.g., a "bug"). In one embodiment, the target program repository 122 stores a target program in three forms—source code, compiled code, and executable code. The source code can be written in any programming language, such as C. In one embodiment, the compiled code is expressed in Low Level Virtual Machine (LLVM) bitcode. LLVM is a compiler infrastructure that is designed for compile-time, link-time, runtime, and "idle-time" optimization of programs written in arbitrary programming languages. LLVM bitcode is a low-level instruction set in static single assignment form. LLVM provides load and store instructions up to word-level granularity, thus providing sufficient control for generating thread schedules that reproduce the desired data races. The executable code is, for example, native binary code.

The bug report repository 124 stores bug reports generated by the execution of one or more target programs. A bug report includes, for example, coredumps, stack traces, and/or call stacks. A bug report represents a given bug and is used to synthesize an execution of a program that will cause the given bug to manifest itself. In one embodiment, a bug report is repaired before it is stored in the bug report repository 124. For example, if a bug corrupts the call stack or the memory heap, then the resulting bug report might not be usable by the execution synthesis module 134. In this situation, the relevant data structures in the bug report are repaired (e.g., the call stack is automatically reconstructed) before storing the bug report in the bug report repository 124.

The synthesized execution file repository 126 stores synthesized execution files for one or more target programs. A synthesized execution file for a particular target program, when used in conjunction with the playback environment module 144, causes the target program to execute in such a way that a bug deterministically manifests itself. In one embodiment, a synthesized execution file includes a) a sequential execution path from the start of the target program to the target basic block and b) various required inputs to the target program. A "basic block" is a straight-line piece of code without any jumps or jump targets. A jump target starts a basic block, and a jump ends a basic block. The "target basic block" is the basic block in which the bug-induced failure was detected (i.e., the basic block where the bug manifested itself). The target basic block is the basic block to which a program execution is desired. The target basic block is also where the program counter (PC) is located within a coredump (e.g., part of a bug report). The various required target program inputs include, for example, concrete values for target program arguments/parameters and interactions with the external environment (e.g., return values from calls to the operating system made by the target program).

If the target program is multi-threaded, then a synthesized execution file further includes a) a sequential execution path from the start of the target program to any target basic block in each program thread and b) a thread schedule for interleaving thread-level sequential paths such that the target program's execution reaches the target basic block and exhibits the bug. In one embodiment, a thread schedule is saved in the form of one or more happens-before relations between specific program instructions. A "happens-before relation" (sometimes referred to as a "happened-before relation") is a means of ordering events based on the potential causal relationship of pairs of events in a concurrent system. In another embodiment, a thread schedule is saved in the form of a strict schedule that includes program instructions on which the context should be switched and switched thread identifiers. The strict schedule can be obtained by recording the exact program instructions on which the context was switched during thread schedule synthesis, along with the switched thread identifiers. When the synthesized execution file is played back using the playback environment module 144, a strict schedule will enforce a literal serial execution of the target program, whereas a schedule based on happens-before relations allows playback to proceed with the same degree of parallelism as the original execution.

The processing server 130 includes various modules such as a compilation module 132 for compiling source code and an execution synthesis module 134 for synthesizing (e.g., generating) an execution of a program. In one embodiment, the processing server 130 includes a computer (or set of computers) that communicates with repository 120 and client device 140 and processes data (e.g., by executing the compilation module 132 and the execution synthesis module 134). In one embodiment, the processing server 130 includes a web server that responds to requests from the client device 140.

The compilation module 132 compiles source code. For example, the compilation module 132 takes as input source code for a target program, generates a compiled version of the target program, and stores the compiled code in the target program repository 122. The source code is obtained, for example, from the target program repository 122.

The execution synthesis module 134 generates an execution of a program. For example, the execution synthesis module 134 takes as input a compiled version of a target program, a bug report, and a bug type, generates an execution of the program that exhibits the bug described by the bug report, and stores the generated execution in the synthesized execution file repository 126 as a synthesized execution file. In this way, the burden of bug reproduction (which is time and resource consuming) is shifted from the software developer to the execution synthesis module 134. Since the bug reproduction portion of the debugging process is automated, runtime tracing is unnecessary, and the accompanying performance and storage overhead is avoided.

The compiled version of the target program is obtained, for example, from the target program repository 122. The bug report is obtained, for example, from the bug report repository 124. The bug type can be, for example, crash, deadlock, incorrect output value, or race condition. In one embodiment, the execution synthesis module 134 generates an execution of a program without using runtime tracing, program modification, and execution recording.

Recall that one technique for diagnosing a bug in a software program is to reproduce the bug by executing the program in such a way that the bug deterministically manifests itself. The program's execution can then be played back and observed in a debugger. The program execution generated by the execution synthesis module 134 causes the bug described by the bug report to manifest itself deterministically. The generated program execution can then be played back in a debugger. In this way, the program execution generated by the execution synthesis module 134 embodies a causality chain leading to a bug, thereby acting as an "explanation" for the bug.

Note that in order to diagnose a particular bug, the exact same program execution that evidenced the bug originally need not be replayed. Instead, playing back any execution that exhibits that same bug will typically be sufficient. For this slightly more modest goal, runtime information is not strictly necessary. The runtime information can be inferred with a combination of program analysis and symbolic execution. Thus, in one embodiment, the execution synthesis module 134 generates a "bug-bound" program execution without recorded program inputs or events that induce non-determinism in program execution and without requiring any alteration of the program or its environment. Note that the execution path generated by the execution synthesis module 134 can be shorter than (but still equivalent to) the execution path that occurred originally when the bug was discovered. Replaying and debugging this shorter execution path will usually be easier than debugging the original execution path, thereby decreasing the amount of debugging time required.

In one embodiment, the execution synthesis module 134 is used directly by a developer during debugging. For example, when a developer is assigned a bug report for a target program, he passes the bug report to the processing server 130 along with a bug type. The compilation module 132 obtains the relevant source code from the target program repository 122, compiles the source code, and saves the resulting bitcode file to the target program repository 122. The source code compilation can use the standard LLVM tool chain.

A developer can instruct the execution synthesis module 134 to enable various types of detection (e.g., data races) during path synthesis. For example, the developer can use the following command line:

synth <bug report file> <target program> < --crash | --deadlock | --race > [--with-race-det] [--with-deadlock-det]

The execution synthesis module 134 then processes the bug report, extracts the necessary information, and computes the goals for synthesis (described below). The execution synthesis module 134 then performs the path and schedule search and produces the synthesized execution file. A developer can then use the playback environment module 144 (described below) to reproduce the bug and optionally attach to the target program with the debugger module 142 (described below). For example, the developer can use the following command line:

play <target program binary> <synthetic execution file>

The execution synthesis module 134 can also be used for automated bug triage. For example, the execution synthesis module 134 is part of an automated bug reporting/triage system, where each incoming bug report is passed to the execution synthesis module 134. The execution synthesis module 134 then produces a synthesized execution file, which gets attached to the bug report. A bug for which there is a synthesized execution can be given higher priority by the triage system. Bugs with similar synthesized executions can be clustered together.

The execution synthesis module 134 can also be used for automated bug deduplication. For example, the execution synthesis module 134 can be used to identify reports of the same bug. If two bug reports result in synthesized executions that are identical, then both bug reports correspond to the same bug.

The execution synthesis module 134 can also be used in conjunction with static analysis tools. For example, the execution synthesis module 134 can be used to identify false positives generated by static analysis tools, such as data race checkers and deadlock checkers. Static analysis is powerful and typically complete, but these properties come at the price of soundness. Static analyzers commonly produce large numbers of false positives, and identifying the true positives becomes a laborious human-intensive task. Since the output of static analysis tools is similar to a bug report, the execution synthesis module 134 can be used to validate each suspected bug. If the execution synthesis module 134 finds a path to the bug, then the suspected bug is a true positive.

After a bug is allegedly fixed, the execution synthesis module 134 can be used to determine whether there still exists a path to the bug. If there still exists a path to the bug, then the bug has not been fixed correctly. This is helpful for concurrency bugs, where patches often do not directly fix the underlying bug but merely decrease its probability of occurrence. If an execution that triggers the bug can no longer be generated, then the patch can be considered successful. The execution synthesis module 134 is further described below with reference to FIG. 3.

The client device 140 is used by a user (e.g., a software developer) to debug a software program. The client device includes a debugger module 142 that enables the user to observe the program's execution and a playback environment module 144 that plays back the program's execution.

The debugger module 142 enables a user to observe a program's execution. For example, the debugger module 142 enables a software developer to observe a target program's execution. The debugger module 142 enables a software developer to observe the buggy behavior and use traditional techniques to find the bug, such as step-by-step execution and data structure dumps. The debugger module 142 also communicates with the playback environment module 144 to obtain information about a program execution that the playback environment module 144 is playing back. In one embodiment, the debugger module 142 is a standard software program used for debugging such as the GNU Project debugger ("GDB").

The playback environment module 144 plays back a program's execution. For example, the playback environment module 144 plays back an execution of a target program. The execution of the target program is obtained from the synthesized execution file repository 126 in the form of a synthesized execution file. The playback environment module 144 plays back a program execution using an executable version of the program. The executable version of the program is obtained, for example, from the target program repository 122. It is also possible to play back other formats, such as the LLVM bitcode.

Playing back the execution of the target program "steers" the target program into following the steps specified in the synthesized execution file and provides an explanation of the bug symptoms in a way that enables the execution to be inspected using the debugger module 142. The target program is executed using the playback environment module 144 and attached to a debugger. Execution can be repeated multiple times, breakpoints can be placed, data structures can be inspected, etc.

In one embodiment, the playback environment module 144 includes a modified version of the KLEE symbolic execution tool. KLEE was developed at Stanford University and built on top of the LLVM compiler infrastructure. KLEE is a symbolic virtual machine designed for single-threaded programs. The modified version of KLEE includes support for multithreaded symbolic execution. In one embodiment, the modified version of KLEE includes support for threads that adhere to the Portable Operating System Interface for Unix (POSIX) family of standards. The modified version of KLEE supports most common operations, such as thread, mutex, and condition variable management, including thread-local storage functions. The modified KLEE thread functions are handlers that intercept the target program's calls to the native threads library within the underlying operating system (i.e., the threads library that would normally be used by the program when executing outside of the playback environment module 144). To create a simulated thread, the playback environment module 144 resolves at runtime the associated start routine and points the thread's program counter to it, creates the corresponding internal thread data structures and a new thread stack, and adds the new thread to the queue of an underlying scheduler (a cooperative scheduler underneath the target program). The playback environment module 144 also maintains information on the state of mutex variables and on how threads are joined.

The playback environment module 144 executes one thread at a time. The decision of which thread to schedule next is made before and after each call to any of the synchronization functions or before a load/store at a program location flagged as a potential data race. Each execution state includes a list of the active threads. To schedule a thread, the playback environment module 144 replaces the stack and instruction pointer of the current state with the ones of the next thread to execute. The playback environment module 144 preserves KLEE's abstraction of a process with an associated address space and adds process threads that share this address space. As a result, KLEE's existing copy-on-write support for forked execution states can be leveraged to reduce memory consumption, thereby making operation of the playback environment module 144 more scalable.

In one embodiment, the playback environment module 144 plays back deadlocks involving mutexes and condition variables with negligible overhead. Playback for data races uses Pin for binary instrumentation. Pin is a software system that performs runtime binary instrumentation of Linux applications and was developed at Intel Corporation. By using binary instrumentation, the playback environment module 144 can control the interleaving of threads' memory accesses.

The playback environment module 144 is further described below with reference to FIG. 4.

Figure 2:
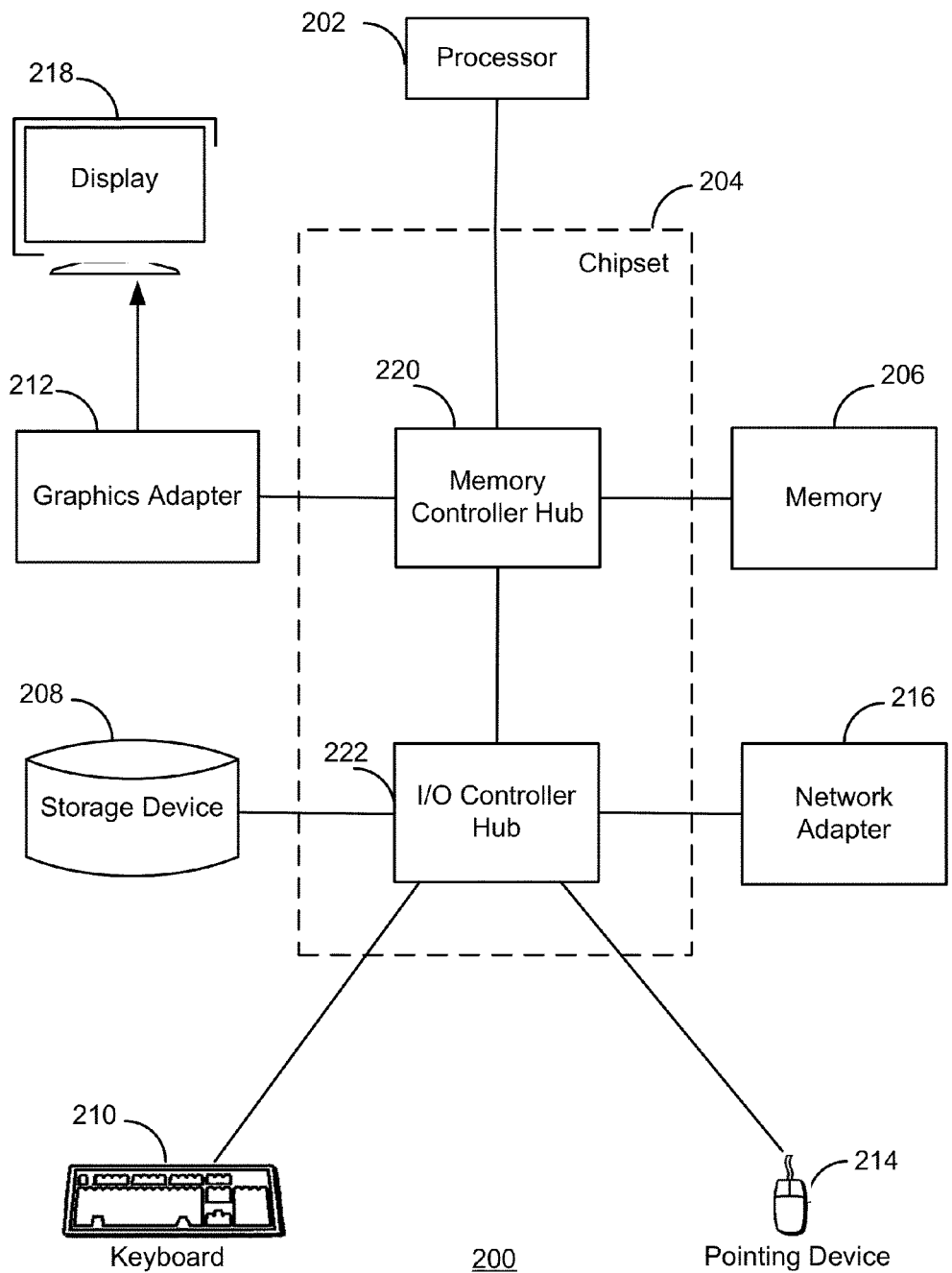
FIG. 2 is a high-level block diagram illustrating an example of a computer for use as a repository, a processing server, and/or a client device, according to one embodiment.

FIG. 2 is a high-level block diagram illustrating an example of a computer 200 for use as a repository 120, a processing server 130, and/or a client device 140 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components, while the client device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
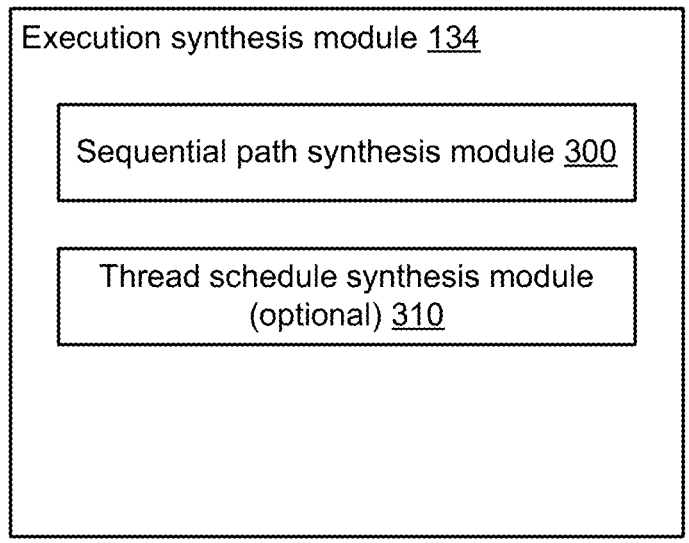
FIG. 3 is a high-level block diagram illustrating a detailed view of the execution synthesis module according to one embodiment.

FIG. 3 is a high-level block diagram illustrating a detailed view of the execution synthesis module 134, according to one embodiment. The execution synthesis module 134 includes a sequential path synthesis module 300 and a thread schedule synthesis module 310. The sequential path synthesis module 300 determines a sequential "bug-bound" execution path. The thread schedule synthesis module 310 determines a schedule for interleaving the sequential execution paths of individual threads such that the program's execution exhibits the reported bug. Note that the thread schedule synthesis module 310 is optional. The thread schedule synthesis module 310 is used only if the target program is multi-threaded.

The sequential path synthesis module 300 determines a sequential bug-bound execution path within each thread of a program. In one embodiment, the sequential path synthesis module 300 includes a modified version of KLEE as described above with reference to the playback environment module 144. The sequential path synthesis module 300 is further discussed below with reference to FIG. 5.

The thread schedule synthesis module 310 determines a schedule for interleaving the execution paths of individual threads (e.g., the execution paths determined by the sequential path synthesis module 300). The thread schedule synthesis module 310 determines a single-processor, sequential execution that that includes contiguous segments from the individual threads' execution paths. In other words, the thread schedule synthesis module 310 determines a serialized execution of a multi-threaded program.

To do so, symbolic execution is used. However, instead of treating only inputs and variables as symbolic, the underlying scheduler's decisions are also treated as symbolic. The underlying scheduler is a cooperative scheduler underneath the target program. The thread schedule synthesis module 310 associates with each preemption point (i.e., each point where the scheduler could preempt a thread) a hypothetical branch instruction that is conditional on a single-bit predicate: if true, the currently-running thread is preempted, otherwise not. These single-bit predicates can be viewed as bits in the representation of a variable that represents the serial schedule. (For programs with more than two threads, predicates have multiple bits, to indicate which thread is scheduled in place of the currently running one.) This variable is treated as symbolic, and the question becomes: What value of this schedule variable would cause the corresponding execution to exhibit the reported bug?

Preemption points of interest are located before and after concurrency-sensitive operation, such as load instructions, store instructions, and calls to synchronization primitives. While the sequential path synthesis phase (see FIGS. 5 and 6) is conceptually separate from the schedule synthesis phase (see FIGS. 7, 8, and 9), one "global" sequential path is generated by exploring the possible thread preemptions as part of the sequential path synthesis.

Just as for sequential path synthesis, the thread schedule synthesis module 310 uses heuristics to make the search for a thread schedule efficient. It is substantially easier to choose the correct heuristic if the thread schedule synthesis module 310 is given the type of concurrency bug it is trying to debug. The type of bug can often be inferred from the bug report. In one embodiment, the bug type is inferred automatically (i.e., without human intervention). For instance, an assert failure bug type and a null pointer dereference bug type are inferred automatically. In another embodiment, the bug type is indicated in the bug report (e.g., the person who reported the bug stated whether the program crashed or hung). In yet another embodiment, human intervention is required to identify the bug type. The thread schedule synthesis module's synthesis of bug-bound paths and schedules exploits features of the corresponding bug report to drastically reduce the search space. While ultimately equivalent to an exhaustive exploration, the thread schedule synthesis module 310 uses heuristics to aggressively steer exploration toward those portions of the search space that have the highest likelihood of revealing the desired bug-bound execution.

In one embodiment, the thread schedule synthesis module 310 can synthesize schedules for two kinds of concurrency bugs: deadlocks and data races. The thread schedule synthesis module 310 is further discussed below with reference to FIG. 7 ("generic" thread schedule synthesis), FIG. 8 (thread schedule synthesis for deadlock bugs), and FIG. 9 (thread schedule synthesis for data race bugs).

Figure 4:
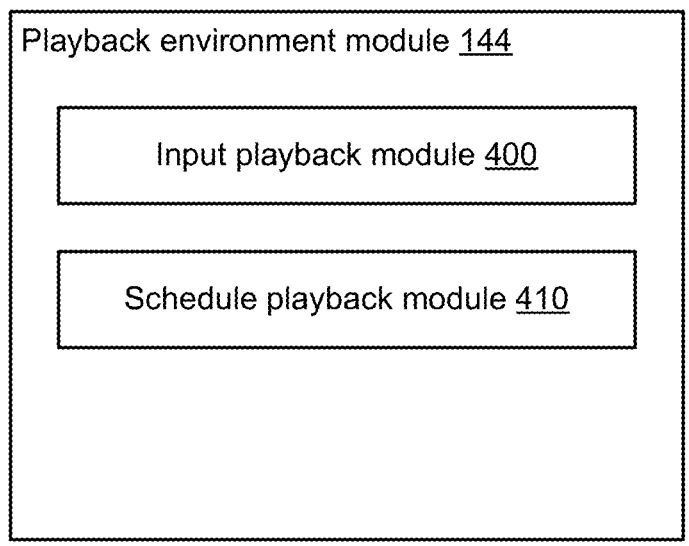
FIG. 4 is a high-level block diagram illustrating a detailed view of the playback environment module according to one embodiment.

FIG. 4 is a high-level block diagram illustrating a detailed view of the playback environment module 144, according to one embodiment. The playback environment module 144 includes an input playback module 400 and a schedule playback module 410. The input playback module 400 plays back various required inputs to a program. The schedule playback module 410 plays back execution paths for program threads according to a thread schedule.

The input playback module 400 plays back various required inputs to a target program. The inputs are obtained, for example, from the synthesized execution file repository 126 in the form of a synthesized execution file. The input playback module 400 obtains the values of command line arguments from the synthesized execution file and passes them to the target program. The input playback module 400 also intercepts calls to the environment and returns the inputs from the synthesized execution file. In one embodiment, the input playback module 400 includes the driver for the KLEE symbolic execution tool. In this embodiment, the input playback module 400 also uses KLEE's symbolic filesystem and network models.

The schedule playback module 410 plays back sequential execution paths for program threads according to a thread schedule. The execution paths and thread schedule are obtained, for example, from the synthesized execution file repository 126 in the form of a synthesized execution file. To play back the synthesized schedule, the schedule playback module 410 gains control of the concrete execution of a program by intercepting synchronization calls with a shim library and by selectively instrumenting the executable version of the program. The intercepted calls are then coordinated by a cooperative scheduler underneath the program being played back. During execution synthesis, the threads of a program were simulated. In contrast, during playback, the program is permitted to create real native threads and call the real native synchronization operations with the actual arguments passed by the program. The calls are intercepted in a library shimmed in via the LD_PRELOAD environment variable on UNIX-like operating systems and the Detours library on Microsoft Windows-based operating systems. In the library, synchronization operations can be delayed as needed to preserve the ordering from the synthesized execution file. For example, the threads are context-switched only when necessary to satisfy the happens-before relations in the synthesized execution file.

In one embodiment, the schedule playback module 410 plays back an execution serially. One single thread runs at a time, and all instructions execute in the exact same order as during synthesis. Serial execution playback makes it easier for a developer to understand how the bug is exercised because the bug's causality chain is more obvious. Serial execution is also more precise, if the program happens to have race conditions. However, performance of parallel programs may be negatively affected by serialization and, in some cases, this might matter.

Figures 5, 6:
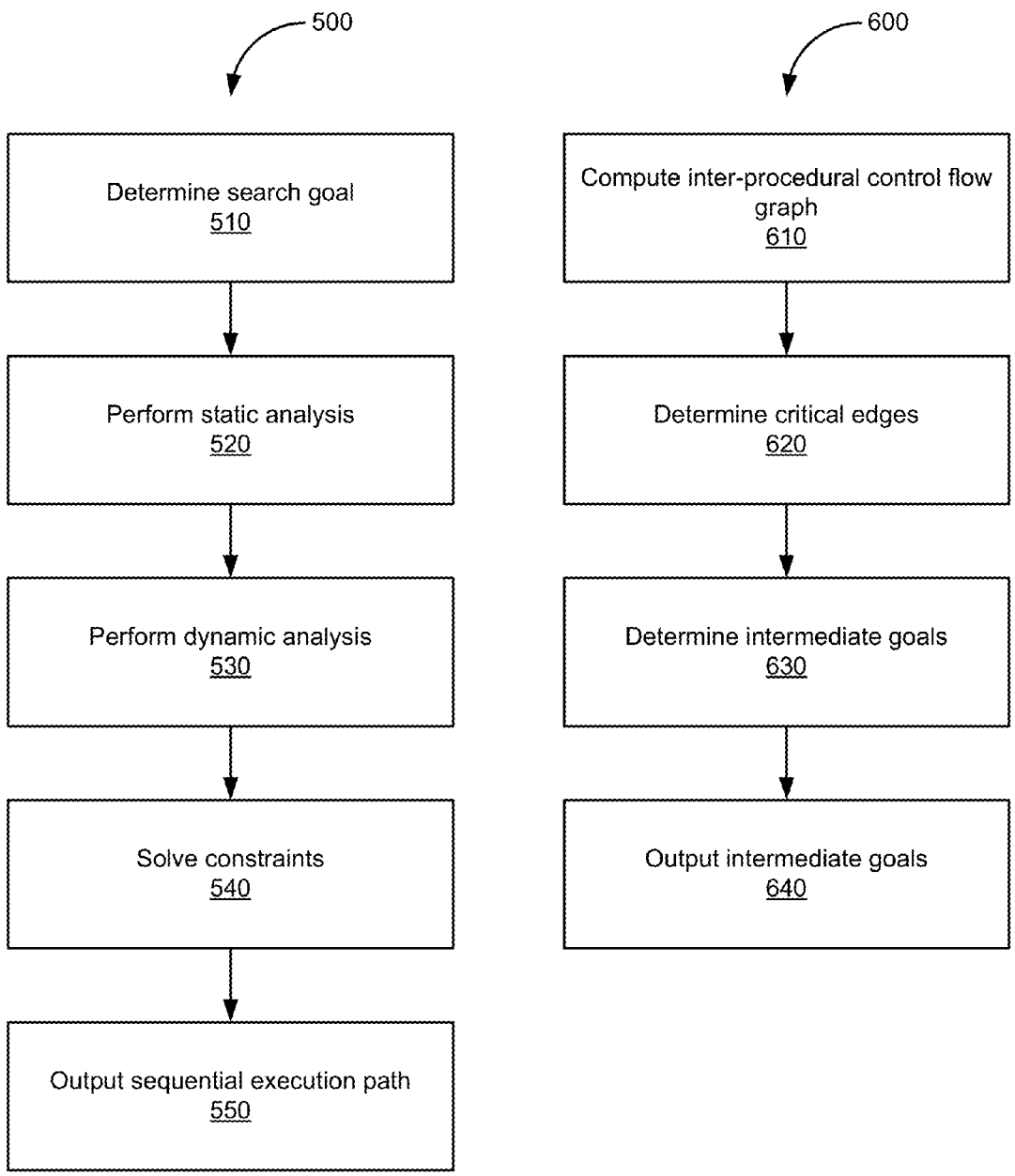
FIG. 5 is a flowchart illustrating a method of determining a sequential execution path that leads to a bug according to one embodiment.
FIG. 6 is a flowchart illustrating a method of performing static analysis according to one embodiment.

FIG. 5 is a flowchart illustrating a method 500 of determining a sequential execution path that leads to a bug according to one embodiment. Other embodiments can perform the steps in different orders and can include different and/or additional steps. In addition, some or all of the steps can be performed by entities other than those shown in FIGS. 1 and 3-4. In one embodiment, if the target program is multi-threaded, then method 500 is executed once for each target basic block in each program thread.

When the method 500 starts, the bug report repository 124 already includes a bug report for the target program that describes the bug to be fixed. At this point, the method 500 begins.

In step 510, a search goal is determined. For example, for each thread present in the bug report, the sequential path synthesis module 300 defines a "goal" as a tuple <B,C> containing the basic block B in which the bug-induced failure was detected, and the condition C on program state that held true when the bug manifested.

The sequential path synthesis module 300 can automatically extract B and C from a bug report for most types of crashes, hangs, and incorrect-output failures. The extraction process depends on the type of the bug. For example, in the case of a segmentation fault, B is determined by the instruction that triggered the access violation, and C indicates the value of the corresponding pointer (e.g., NULL) extracted from the coredump. For a deadlock, B contains the lock statement the thread was blocked on at the time the program hung, and C captures the fact that there was a circular wait between the deadlocked threads. As a final example, for a race condition, B is where the failure (i.e., manifestation of the bug) was detected (not where the race itself occurred) such as a failed assert, and C is the observed failure (e.g., a negation of the assert condition).

If the crash occurs inside an external library, B contains the call to the external library function, and C indicates that the values of the arguments are the ones with which that library function was called when the crash occurred. The values of the arguments are extracted from the coredump and the call stack contained in the bug report.

In step 520, static analysis is performed. For example, once the goal <B,C> has been determined, the sequential path synthesis module 300 performs a static analysis pass to narrow down the search space of target program execution paths to the goal. Intermediate goals are statically determined, producing an over-approximation of the path from program start to goal <B,C>. This phase operates on the program's control flow graph (CFG) and data flow graph (DFG). For example, context-sensitive intra- and inter-procedural data flow analysis is performed to identify the set of paths through the CFG that reach the bug location. Step 520 is further discussed below with reference to FIG. 6.

In step 530, a dynamic analysis is performed. For example, the sequential path synthesis module 300 uses symbolic execution to narrow down the over-approximation (from step 520) into one feasible path to the goal. To perform the dynamic analysis, the sequential path synthesis module 300 executes program P with symbolic inputs that are initially unconstrained (i.e., which can take on any value, unlike regular "concrete" inputs). Correspondingly, program variables are assigned symbolic values. When the program encounters a branch that involves symbolic values (either program variables or inputs from the environment), program state is forked to produce two parallel executions, one following each outcome of the branch (referred to as the symbolic branch resulting in two "execution states"). Program variables are constrained in the two execution states so as to make the branch condition evaluate to true or false, respectively. If, due to existing constraints, one of the branches is not feasible, then no forking occurs. Constraints on program state accumulate in each independent execution.

An execution state includes a program counter, a stack, and an address space. Such states can be "executed" (i.e., the instruction pointed to by the program counter can be executed) by a symbolic execution engine and may cause corresponding updates to the state's stack and address space.

As new executions are forked, the corresponding execution states are added to a priority queue. At every step of the symbolic execution, an execution state is chosen from the priority queue and one instruction is executed in that state, after which a new execution state is chosen, and so on, which leads to the creation of the execution tree. In this way, the entire space of execution paths can be explored, and the symbolic execution engine switches from one execution state to the other, depending on the ordering of the states in the queue. When the goal <B,C> is encountered in one of these executions, the sequential path synthesis module 300 knows that it has found a feasible path from start to goal.

There are two challenges, though: the execution tree grows very fast, and determining the satisfiability of constraints at every branch condition, in order to determine which of the branches are feasible, is CPU-intensive. These two properties make symbolic execution impractical for large programs. For the sequential path synthesis module 300 to be practical, the search for a path to the goal should be very focused. The less of the tree that is expanded and searched, the less CPU and memory are consumed.

In one embodiment, the sequential path synthesis module 300 uses three techniques to focus the search. First, it uses statically-derived intermediate goals (see step 520) as anchor points in the search space, to divide a big search into several small searches. Second, the sequential path synthesis module 300 leverages the information about critical edges (discussed below with reference to FIG. 6) to promptly abandon during symbolic execution paths that are statically known to not lead to the goal. Third, the sequential path synthesis module 300 orders the priority queue of execution states based on each state's estimated proximity to the next intermediate goal (further described below). In this way, the search is consistently steered toward choosing and exploring executions that appear to be more likely to reach the intermediate goal soon.

These three techniques of focusing the search (proximity-based guidance, the use of intermediate goals, and path abandonment based on critical edges) can speed up the search by several orders of magnitude compared to other search strategies. Nevertheless, further techniques can be employed to improve the search strategy. For instance, if the initialization phase of the program can be reproduced by other means, such as from an existing test case, the sequential path synthesis module 300 could run concretely the initialization phase and automatically switch from concrete to symbolic execution later in the execution of the program, thus reducing execution synthesis time.

The third technique is referred to as "proximity-guided search." The sequential path synthesis module 300 uses guided forward symbolic execution to search for a path that reaches the goal extracted from the bug report. In doing so, the sequential path synthesis module 300 uses a proximity heuristic to estimate how long it would take each execution state to reach the goal. The sequential path synthesis module 300 then executes the execution state that is closest to the goal. FIG. 12 is a listing of pseudocode illustrating a simplified heuristic proximity to goal according to one embodiment.

The proximity of an execution state to a goal equals the fewest number of instructions the sequential path synthesis module 300 estimates would need to be executed in order to reach that goal from the current program counter in the execution state (FIG. 12, line 1). This bound aims to be as tight as possible and can be computed with low overhead.

When the goal is inside the currently executing procedure, function distance computes the proximity. If there are no calls to other procedures, the distance is the length of the path to the goal with the fewest number of instructions (FIG. 12, lines 9-12). If, however, any of the instructions along the path are calls to other procedures, then the sequential path synthesis module 300 factors in the costs of executing those procedures by adding to the path length the cost of the calls (FIG. 12, lines 13-14).

The cost of calling a procedure corresponds to the number of instructions along the shortest path from the procedure's start instruction to the nearest return point. This is a special case of computing the distance of an arbitrary instruction to the nearest return (function dist2ret, FIG. 12, lines 17-22).

When the goal is not in the currently executing procedure, it may be reached via a procedure that is in a frame higher up in the call stack. In other words, the currently executing procedure may return, and the caller of the procedure may be able to reach the goal, or the caller's caller may do so, etc. Thus, the sequential path synthesis module 300 computes a distance estimate for each function on the call stack of the current execution state (FIG. 12, lines 3-4). The estimate takes into account the instructions that have to be executed to return from the call plus the distance to the goal for the instruction that will be executed right after the call returns (FIG. 12, line 5). The final distance to the goal is the minimum among the distances for each function on the call stack (FIG. 12, line 6).

Each execution state S in the sequential path synthesis module 300 has n distances associated with it, corresponding to S's distance to the $G_1, \ldots, G_{n-1}$ intermediate goals inferred through static analysis and to the final goal $G_n$=B. The closer an intermediate goal truly is, the more accurate the distance estimate is. The sequential path synthesis module 300 maintains n "virtual" priority queues $Q_1, \ldots, Q_n$, which provide an ordering of the state's distance to the respective goal: the state at the front of $Q_i$ has the shortest estimated distance to goal $G_i$. These queues are referred to as "virtual" because the queue elements are just pointers to the execution states. Each state can be found on each of the virtual queues.

In one embodiment, the sequential path synthesis module 300 caches computed distances and uses specialized data structures to track search state information, thereby speeding up the computation of the distance to the goal during synthesis. Execution states can be switched at the granularity of individual instructions (i.e., switching is performed frequently), so the selection of the next state to execute should be performed efficiently.

At each step of the dynamic analysis, the sequential path synthesis module 300 picks a state S from the front of one of the queues. The choice of which queue to consult is uniformly random across the queues. The front state is dequeued, and the instruction at S.pc is symbolically executed, which updates the program counter, stack, and address space, and recomputes the distances from the new S.pc. The rationale of choosing states this way is to progressively advance states toward the nearest intermediate goal. Since the static analysis does not provide an ordering of the intermediate goals, the sequential path synthesis module 300 cannot choose which goal to try to reach first. It is possible, in principle, for the static phase to provide a partial order on the intermediate goals based on the inter-procedural CFG.

Once a state has reached the final goal (i.e., S.pc=B), the search completes. The sequential path synthesis module 300 has found a feasible path that explains the buggy behavior.

Note that several programming constructs (such as recursion, system calls, and indirect calls) can pose challenges to the computation of a distance heuristic. In one embodiment, the cost of a path that encounters recursion and system calls is increased by a fixed amount. For example, if a path leads to a recursive or multilevel recursive call, a weight of 1000 instructions is assigned to that call. Indirect calls are resolved with alias analysis. If that is not possible, then the sequential path synthesis module 300 averages the cost of the call instruction across all possible targets. The distance estimate is just a heuristic, so a wrong choice would merely make the path search take longer but not affect correctness.

Another concern in heuristic-driven searches is local minima. Fortunately, local minima are a danger mainly for search processes that cannot backtrack. In path search, the sequential path synthesis module 300 can backtrack to execution states that are higher up in the execution tree, thus avoiding getting stuck in local minima.

In step 540, constraints are solved. Referring back to step 530, once an execution finishes, the conjunction of all constraints along the path to that terminal leaf node is determined. The sequential path synthesis module 300 solves the conjunction of these constraints with the help of a satisfiability modulo theories (SMT) constraint solver or the like. The solution is a set of program inputs that exercises that particular path. For all program input, including that coming from the environment (e.g., in the form of system call returns), the sequential path synthesis module 300 solves the constraints found during step 530 and produces corresponding concrete values. The sequential path synthesis module 300 solves the constraints that accumulated along the path and computes all the inputs required for the program to execute that path, in a way similar to automated test generation. In one embodiment, the sequential path synthesis module 300 relies on symbolic models of the filesystem and the network stack to ensure all symbolic input/output (I/O) stays consistent.

In step 550, a sequential execution path is output. For example, the sequential path synthesis module 300 outputs a sequential execution path, including inputs required for the program to execute that path.

FIG. 6 is a flowchart illustrating a method 600 of performing static analysis (step 520 of FIG. 5) according to one embodiment. Other embodiments can perform the steps in different orders and can include different and/or additional steps. In addition, some or all of the steps can be performed by entities other than those shown in FIGS. 1 and 3-4.

In step 610, the program's inter-procedural control flow graph (CFG) is computed. For example, the sequential path synthesis module 300 computes the full inter-procedural CFG of the program and applies all the optimizations that were applied to the program version that experienced the reported bug. The sequential path synthesis module 300 performs alias analysis and resolves as many function pointers as possible, replacing them with the corresponding direct calls. This can substantially simplify the CFG. The sequential path synthesis module 300 can handle the case when not all function pointers are resolved, though the sequential path synthesis module 300 may lose precision. In this case, subsequent analyses will still be sound and complete but may take longer to execute. The sequential path synthesis module 300 also eliminates all basic blocks that cannot be reached from the start of the program (i.e., dead code) and all basic blocks from which there is no path to B.

In step 620, critical edges are determined. A "critical edge" is an edge that must be followed by any execution path that reaches the goal. Conditional branch instructions generate two outgoing edges in the CFG, corresponding to the true and else branches, respectively. If, for a given branch instruction b, only one of the outgoing edges can be part of a path to the goal, then it is a critical edge. When branch instruction b is encountered during dynamic analysis (step 530), the sequential path synthesis module 300 will ensure the critical edge is followed. Otherwise, the search would miss the goal.

In one embodiment, the sequential path synthesis module 300 uses backward control flow analysis to identify the critical edges in the CFG (i.e., those that must be present on the path to the goal). The sequential path synthesis module 300 identifies the critical edges by starting from the goal basic block B and working backward, in a manner similar to backward slicing. Starting from B, the algorithm finds at each step a predecessor node in the CFG. For each such node, if only one of its outgoing edges can lead to B, then that edge is marked as critical. In one embodiment, the sequential path synthesis module 300 can explore only one predecessor for each node, so as soon as a block with multiple predecessors is found, the marking of critical edges stops and the sequential path synthesis module 300 moves to the next step. A more effective, but potentially slower, algorithm would explore all predecessors and identify multiple sets of critical edges.

In step 630, intermediate goals are determined. An "intermediate goal" is a basic block in the CFG that is guaranteed to be present on the path to the goal block B (i.e., it is a "must have"). The knowledge that certain instructions must be executed helps the dynamic analysis (step 530) divide the search for a path to the final goal into smaller searches for sub-paths from one intermediate goal to the next.

In one embodiment, the sequential path synthesis module 300 uses data flow analysis to determine intermediate goals (i.e., basic blocks that, according to the data flow graph (DFG), must execute in order for the critical edges to be traversable). To determine intermediate goals, the sequential path synthesis module 300 relies on the critical edges (from step 620). For each critical edge, the corresponding branch condition and its desired value (true or false) are retrieved. For each variable x, y, . . . in the branch condition, the sequential path synthesis module 300 finds the sets of instructions $D_x$, $D_y$, . . . that are reaching definitions of the variable. The sequential path synthesis module 300 then looks for combinations of instructions from $D_x$, $D_y$, . . . that would give the branch condition the desired value (i.e., instructions for which there is a static guarantee that, if they were executed, the critical edge would be followed). When such a combination is found, the basic blocks that contain the reaching definitions in the combination are marked as intermediate goals. If more than one combination exists, the corresponding sets of instructions are marked as disjunctive sets of intermediate goals.

In step 640, intermediate goals are output. In one embodiment, the sequential path synthesis module 300 outputs the intermediate goals, which are then passed to the dynamic analysis phase (step 530) to trim down the search space of the dynamic analysis.

While condition C in goal <B,C> is not explicitly used in the above algorithms, the sequential path synthesis module 300 does use C in its analyses. To a first degree of approximation, basic block B is replaced in the program with a statement of the form if (C) then BugManifests, and the static analysis phase executes on the transformed program, with BugManifests as the goal basic block. By finding a path along which the program executes BugManifests, the sequential path synthesis module 300 will have found a path that executes block B while condition C holds (i.e., a path that reaches the original goal <B,C>). Some conditions, however, cannot be readily expressed in this way. For example, a deadlock condition is a property that spans the sequential execution paths of multiple threads. For such cases, the sequential path synthesis module 300 has special-case handling to check condition C during the dynamic phase. This will be further described with reference to FIGS. 7, 8, and 9.

FIG. 7 is a flowchart illustrating a method 700 of determining a schedule for interleaving the execution paths of individual threads for a generic bug according to one embodiment. Other embodiments can perform the steps in different orders and can include different and/or additional steps. In addition, some or all of the steps can be performed by entities other than those shown in FIGS. 1 and 3-4.

In step 710, a bug type is determined based on a bug report. The bug report is obtained, for example, from the bug report repository 124.

In step 720, a thread schedule synthesis heuristic is determined based on the bug type (from step 710).

In step 730, a cooperative single-processor thread scheduler is used to schedule execution paths of individual threads. The execution paths are obtained, for example, from the sequential path synthesis module 300.

In step 740, execution before and after synchronization operations and memory operations is preempted.

In step 750, execution at preemption points is forked to explore both schedules. Specifically, in one schedule the current thread is preempted, and in the other schedule the current thread is not preempted at the respective preemption point.

In step 760, thread schedules that are more likely to reproduce the bug are prioritized. In one embodiment, the likelihood that a particular thread schedule can reproduce the bug is determined based on various bug-specific heuristics.

FIG. 8 is a flowchart illustrating a method 800 of determining a schedule for interleaving the execution paths of individual threads for a deadlock bug according to one embodiment. Other embodiments can perform the steps in different orders and can include different and/or additional steps. In addition, some or all of the steps can be performed by entities other than those shown in FIGS. 1 and 3-4.

In step 810, preemptions before and after mutex lock and unlock operations are enabled. When looking for a path to a deadlock, the preemption points of interest are solely the calls to synchronization primitives, like mutex "lock" and "unlock." In most programs, there are orders-of-magnitude fewer such calls than branches that depend (directly or indirectly) on symbolic inputs, so the magnitude of the deadlock schedule search problem can be substantially smaller than that of sequential path search.

In step 820, call stacks of deadlocked threads are used as goals for sequential synthesis. In this way, the synthesized execution will reach a state in which threads' call stacks are the same as the call stacks from the bug report. Information about the deadlocked threads' final call stacks provides strong clues as to how threads must interleave in order to deadlock. The thread schedule synthesis module 310 leverages these clues to bias the search toward interleavings that are more likely to lead to the reported deadlock.

In step 830, execution before a potential outer lock is preempted. An "inner lock" is a lock request that blocked a thread. An "outer lock" is a lock that is already held by the deadlocked thread. This naming reflects the fact that a deadlock typically arises from nested locks, where an inner lock is requested while holding an outer lock. At the time of deadlock, the acquisitions of the outer locks are not visible in the call stack anymore.

In step 840, a snapshot map is maintained with thread schedules generated at preemption points. If the thread schedule synthesis module 310 encounters a lock or unlock operation, it forks off an execution state in which the current thread is preempted. The running execution state maintains a pointer to that forked state, in case the thread schedule synthesis module 310 needs to return to that state to explore alternate schedules. More generally, each execution state S is augmented with a map $K_S$: mutex→execution state. An element <M,S'>∈$K_S$ indicates that S is exploring one schedule outcome connected with the acquisition of mutex M, while S' is the starting point for exploring alternative scheduling outcomes. A snapshot entry <M,S'> is deleted when M is unlocked. The size of $K_S$ is therefore bounded by the program's maximum depth of lock nesting. In one embodiment, the thread schedule synthesis module 310 uses KLEE's copy-on-write mechanisms at the level of memory objects to maximize memory sharing between execution states. As a result, snapshots are cheap.

Execution state S is augmented with S.scheduleDistance, an estimate of how much context switching is required to reach the deadlock. For the case of two-thread deadlocks, this schedule distance can take one of two values: "far" or "near." The thread schedule synthesis module 310 computes a weighted average of the path distance estimate (discussed above with reference to step 530) and the schedule distance estimate, with a heavy bias toward schedule distance. The state priority queues are kept sorted by this weighted average. The bias ensures that low-schedule-distance execution states are selected preferentially over low-path-distance states.

In step 850, execution is resumed from a thread schedule stored in the snapshot map.

In step 860, a determination is made regarding whether the deadlock was reproduced. If the deadlock was not reproduced, then the method returns to step 850, where execution is resumed from a different thread schedule stored in the snapshot map. If the deadlock was reproduced, then the method proceeds to step 870, where the thread schedule that reproduces the deadlock is output.

Regarding steps 850 and 860, the general strategy for schedule synthesis is to help each thread "find" its outer lock as quickly as possible. If a thread $T_1$ requests a mutex M that is free, the thread schedule synthesis module 310 forks state S' from S and allows the mutex acquisition to proceed in S, while in S' thread $T_1$ is preempted before acquiring M. In S, the thread schedule synthesis module 310 must decide whether to let $T_1$ continue running after having acquired M, or to preempt it. If, by acquiring M, $T_1$ did not acquire its inner lock (i.e., the program counter of the lock statement in state S is different from that in the goal), then the thread schedule synthesis module 310 lets $T_1$ run unimpeded. However, if $T_1$ just acquired its inner lock, then the thread schedule synthesis module 310 preempts it and marks S.scheduleDistance=near. This keeps M locked and creates the conditions for some other thread $T_2$ to request M. When this happens, it is a signal that M could be $T_2$'s outer lock. The updated schedule distance ensures state S is favored for execution over other states that have no indication of being close to the deadlock.

If thread $T_1$ requests mutex M, and M is currently held by another thread $T_2$, the thread schedule synthesis module 310 must decide whether to "roll back" $T_2$ to make M available to $T_1$, or to let $T_1$ wait. If M is $T_2$'s inner lock, then it means that M could be $T_1$'s outer lock, so the thread schedule synthesis module 310 tries to make M available, to give $T_1$ a chance to acquire it. The thread schedule synthesis module 310 switches to state $S_k$ (from the <M,$S_k$> snapshot taken just prior to $T_2$ acquiring M), which moves execution back to the state in which $T_2$ got preempted prior to acquiring M.

The thread schedule synthesis module 310 does this by setting, for each state in $K_S$, the schedule distance to near. It then sets the current state's schedule distance to far, to deprioritize it. This creates the conditions for $T_1$ to acquire M, its potential outer lock. When $T_2$ later resumes in a state in which $T_2$ does not hold M, mutex M is likely to be held by $T_1$ and about to be requested by $T_2$, thus increasing the chances of arriving at the desired deadlock.

Whenever a mutex M is unlocked, the snapshot corresponding to M is deleted (i.e., $K_S$←$K_S$-<M,*>). The thread schedule synthesis module 310 deletes these snapshots because a mutex that is free (unlocked) cannot be among the mutexes that cause a deadlock.

Note that method 800 can be generalized to more than two threads. The thread schedule synthesis module 310 can synthesize thread schedules for deadlocks involving an arbitrary number of threads, even when only a subset of a program's threads are involved in the deadlock.

During schedule synthesis, the thread schedule synthesis module 310 automatically detects mutex deadlocks by using a deadlock detector based on a resource allocation graph. Deadlocks involving condition variables are more challenging to detect automatically. Inferring whether a thread that is waiting for a condition variable will eventually be signaled by another thread is undecidable in general. However, the thread schedule synthesis module 310 can check for the case when no thread can make any progress and, if all threads are waiting to be signaled, to acquire a mutex, or to be joined by another thread, then the thread schedule synthesis module 310 identifies the situation as a deadlock.

When searching for a schedule that reproduces a reported deadlock, the thread schedule synthesis module 310 may encounter deadlocks that do not match the reported bug. This means that the thread schedule synthesis module 310 has discovered a different bug. The thread schedule synthesis module 310 records the information on how to reproduce this deadlock, notifies the developer, rolls back to a previous snapshot, and resumes the search for the reported deadlock.

Figure 9:
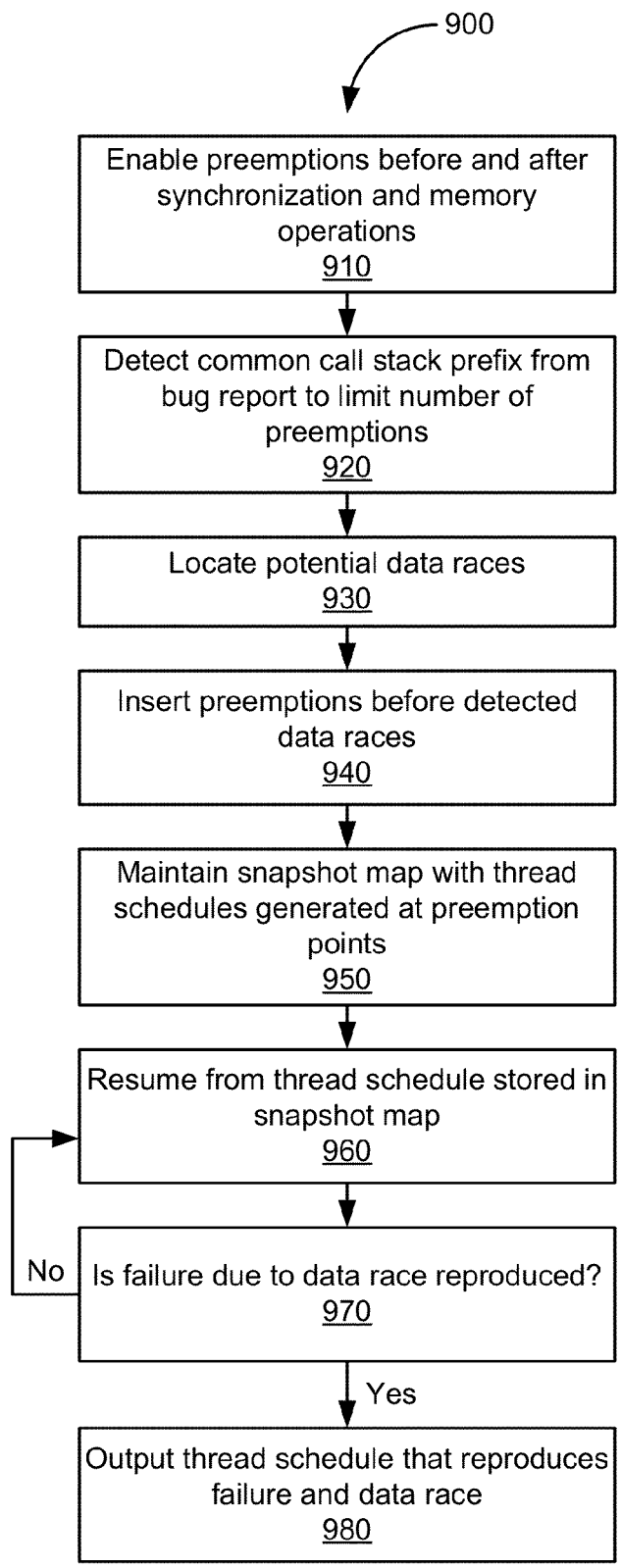
FIG. 9 is a flowchart illustrating a method of determining a schedule for interleaving the execution paths of individual threads for a data race bug according to one embodiment.

FIG. 9 is a flowchart illustrating a method 900 of determining a schedule for interleaving the execution paths of individual threads for a data race bug according to one embodiment. Other embodiments can perform the steps in different orders and can include different and/or additional steps. In addition, some or all of the steps can be performed by entities other than those shown in FIGS. 1 and 3-4.

In step 910, preemptions before and after synchronization and memory operations are enabled. To find paths to data races, the thread schedule synthesis module 310 takes an approach similar to the one for deadlocks: place preemptions at all the relevant places, and then explores first those schedules most likely to reveal the data race. Snapshotting is used in much the same way, piggybacking on the copy-on-write mechanism for managing execution states. In addition to synchronization primitives, the thread schedule synthesis module 310 also introduces preemptions before instructions flagged as potential data races.

In step 920, a common call stack prefix is detected from a bug report to limit the number of preemptions. In order to avoid unnecessary thread schedules early in the execution of the program, the thread schedule synthesis module 310 uses an additional heuristic. The thread schedule synthesis module 310 identifies the longest common prefix of the final thread call stacks in the coredump and inserts preemptions only in executions whose call stacks contain this prefix. If the last frame of the common prefix corresponds to procedure p, then p is set as an intermediate goal for each thread. Once all threads reach their respective goals (or when no threads can make any further progress), the thread schedule synthesis module's scheduler starts forking execution states on fine-grain scheduling decisions and checks for data races. This heuristic works well in practice, especially considering that many applications run the same code in most of their threads.

In step 930, potential data races are located. In step 940, preemptions are inserted before detected data races. Regarding steps 930 and 940, thread schedule synthesis module 310 uses a data race detection algorithm and inserts preemption points wherever potentially harmful data races are detected. Normally, both dynamic and static data race detectors can miss races, because they observe only execution paths (e.g., the paths exercised by a given workload). However, by using symbolic execution, the thread schedule synthesis module 310 can expose to the detection algorithm an arbitrary number of different execution paths, independently of workload.

In step 950, a snapshot map is maintained with thread schedules generated at preemption points.

In step 960, execution is resumed from a thread schedule stored in the snapshot map.

In step 970, a determination is made regarding whether the failure due to the data race was reproduced. Not only must the data race bug occur, but the data race bug must also lead to the failure represented in the bug report. If the failure due to the data race was not reproduced, then the method returns to step 960, where execution is resumed from a different thread schedule stored in the snapshot map. If the failure due to the data race was reproduced, then the method proceeds to step 980, where the thread schedule that reproduces the failure and data race is output.

For simplicity and clarity, a sequential consistency model is assumed for memory shared among threads, an assumption present in most recent systems dealing with concurrency bugs. An immediate consequence is that each machine instruction is assumed to execute atomically with respect to memory, which simplifies the exploration process. In the case of shared memory with relaxed consistency, the thread schedule synthesis module 310 could miss possible paths but will never synthesize an infeasible execution leading to a bug goal.

Data race detection can be enabled even when debugging non-race bugs. In this way, the thread schedule synthesis module 310 can synthesize paths even to bugs (e.g., deadlocks or buffer overflows) that manifest only in the presence of data races. Moreover, as with deadlocks, unknown data races may be fortuitously discovered.

Figures 10, 11:
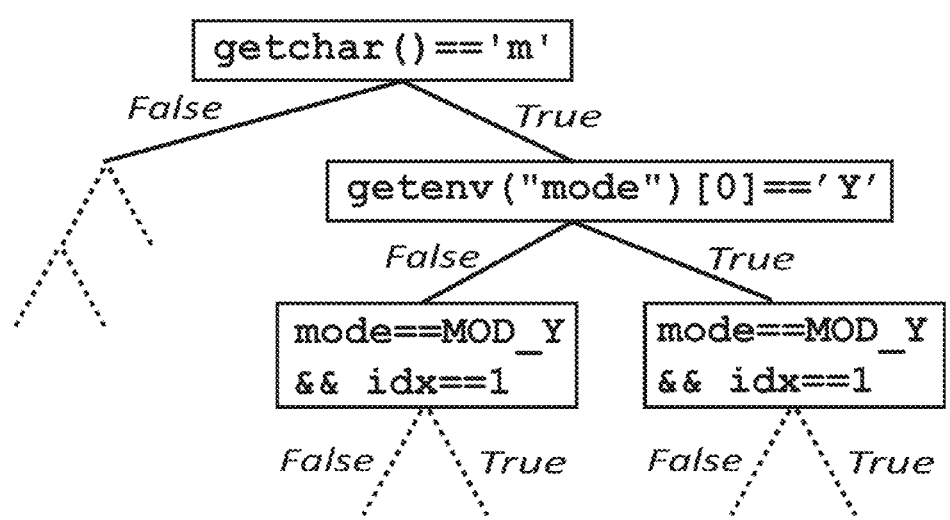
FIG. 10 is a listing of pseudocode illustrating an example of a deadlock bug.
FIG. 11 is an execution tree corresponding to the listing of pseudocode in FIG. 10.

The operation of the execution synthesis module 134 is now explained in the context of an actual bug. FIG. 10 is a listing of pseudocode illustrating an example of a deadlock bug according to one embodiment. In this example, two threads executing CriticalSection( ) concurrently may deadlock if the condition on line 10 is true and one thread is preempted right after executing statement 11. An execution in which the threads deadlock is the following: One thread runs up to line 11 and is preempted right after the unlock call, then a second thread executes up to line 9 and blocks waiting for mutex $M_2$, then the first thread resumes execution and blocks waiting for $M_1$ on line 12. The program is now deadlocked.

The bug report for this deadlock would likely contain the final stack trace of each thread but would be missing several important pieces of information needed for debugging, such as the return values of external calls (getchar( ) and getenv( ) and the interleaving of threads. The execution synthesis module 134 "fills in the blanks" and infers two key aspects of the buggy execution: a program path in each thread from the beginning to where the bug occurs, and a schedule that makes this path feasible.

To synthesize the path through the program for each thread, the execution synthesis module 134 first statically analyzes the program and then performs a dynamic symbolic analysis. In the static analysis phase, the execution synthesis module 134 computes the control flow graph (CFG) and performs intra- and inter-procedural data flow analysis to identify the set of paths through the graph that reach the bug location. For the example in FIG. 10, the execution synthesis module's static analysis identifies two paths that could lead the first thread to statement 12: 1→2→3→4→7→ . . . →12 and 1→3→4→7→ . . . →12, both of which require getenv ("mode") to return a string starting with 'Y'. Since the execution synthesis module 134 cannot decide statically whether statement 2 is part of the path to statement 12 or not, both alternatives are considered possible. For the second thread, a similar analysis finds four possible paths to statement 9.

In the dynamic analysis phase, the execution synthesis module 134 symbolically executes the program in search of a guaranteed-feasible path. The search space is restricted to the paths identified during the static analysis phase. In the FIG. 10 example, the execution synthesis module 134 determines that only path 1→2→3→4→7→ . . . →12 can take the first thread to statement 12, since it is the only one that sets idx to value 1. This dynamic phase also identifies the need for getchar( ) to return 'in'. For the second thread, all four paths appear feasible for the time being.

Symbolic execution suffers from the notorious "path explosion" problem. The execution synthesis module 134 therefore incorporates a number of techniques to cope with the large number of paths that typically get explored during symbolic execution. The foremost of these techniques is the use of a proximity heuristic to guide symbolic execution on those paths most likely to reach the bug. The execution synthesis module 134 uses the CFG to estimate the distance (in basic blocks) from any given node in the CFG to the bug location. Using this estimate, the exploration of paths is steered toward choices that have a shorter distance to the bug, thus enabling the execution synthesis module 134 to find a suitable path considerably faster than mere symbolic execution.

For multi-threaded programs, synthesizing the execution path for each thread is not enough. The execution synthesis module 134 must also identify a thread interleaving that makes these paths possible. The execution synthesis module 134 does this thread schedule search within the dynamic analysis phase. To make it fast, the execution synthesis module 134 uses the stack traces from the bug report to attempt thread preemptions in strategic places (such as before calls to mutex lock operations) that have high probability of leading to the desired schedule. In the FIG. 10 example, the execution synthesis module 134 identifies the required preemption points after statement 11 (first thread) and statement 9 (second thread). It also propagates the constraints on getchar( ) and getenv( ) in the first thread to the path choice for the second thread.

Recall that when a program encounters a branch that involves symbolic values (either program variables or inputs from the environment), program state is forked to produce two parallel executions, one following each outcome of the branch (referred to as the symbolic branch resulting in two "execution states") (step 530 in FIG. 5). Note that the first if statement in FIG. 10 depends on the return value of getchar( ). The sequential path synthesis module 300 therefore forks off a separate execution in which getchar( )='m'. The current execution continues with getchar( )='m'. Executions recursively split into sub-executions at each subsequent branch, creating an execution tree like the one in FIG. 11. FIG. 11 is an execution tree corresponding to the listing of pseudocode in FIG. 10 according to one embodiment.

Recall also that once an execution finishes, the conjunction of all constraints along the path to that terminal leaf node is determined (step 540 in FIG. 5). Referring to FIG. 11, the rightmost leaf execution (after the third fork) has constraints mode=MOD_Y and idx=1 and the first character of getenv( )'s return must be 'Y' and the return of getchar( ) must be 'm'. Everything else is unconstrained in this particular execution. Also, for all program input, including that coming from the environment, the sequential path synthesis module 300 solves the constraints found during step 530 and produces corresponding concrete values (step 540 in FIG. 5). In the FIG. 10 example, the corresponding concrete values are as getchar( )='m' and getenv("mode") [0]='Y').

Recall that FIG. 8 is a flowchart illustrating a method of determining a schedule for interleaving the execution paths of individual threads for a deadlock bug according to one embodiment. For the deadlock example in FIG. 10, a coredump would indicate call stacks that (in stylized form) would look like $T_1$: [ . . . 12] and $T_2$: [ . . . 9], meaning that thread $T_1$ was blocked in a lock call made from line 12, while $T_2$ was blocked in a lock call made from line 9. The call stack shows the call sequence that led to the lock request that blocked the thread. This lock request appears in the last frame, and it is referred to as the thread's inner lock. Outer locks are those that are already held by the deadlocked thread. This naming reflects the fact that a deadlock typically arises from nested locks, where an inner lock is requested while holding an outer lock. At the time of deadlock, the acquisitions of the outer locks are not visible in the call stack anymore.

For the example bug, the search goal for each thread is $T_1$:<12,$T_2$@9> and $T_2$ :<9,$T_1$@12>, meaning that $T_1$ blocks at line 12 while $T_2$ blocks at line 9. The thread schedule synthesis module 310 now seeks an interleaved execution that leads to this goal, without any knowledge of where the outer locks were acquired.

Thread $T_1$ needs to get to line 12. The thread schedule synthesis module 310 takes $T_1$ rather uneventfully up to line 10, with snapshots having been saved prior to the lock operations at line 8 and 9. Once the thread schedule synthesis module 310 encounters condition mode=MOD_Y^idx=1 on line 10, it must follow the true-branch, because it is a critical edge. This brings $T_1$ eventually to line 12. By this time, due to the unlock on line 11, there is only one snapshot left in $K_S$={<$M_2$,$S_9$>}, from the lock on line 9. At line 12, a copy of the current state is forked and $K_S$={<$M_2$,$S_9$>, <$M_1$,$S_{12}$>}. $T_1$ acquires $M_1$ and then $T_1$ is preempted.

$T_2$ runs until it reaches line 8, where it blocks for $M_1$ (held by $T_1$). Since $M_1$ was acquired as $T_1$'s inner lock, the thread schedule synthesis module 310 switches to state $S_{12}$, in which $T_1$ is preempted immediately prior to acquiring $M_1$. This allows $T_2$ to run and acquire $M_1$, but it blocks again on line 9 when trying to get $M_2$ (held by $T_1$). $T_1$ is scheduled back, and the program is now in the situation that $T_1$ is holding $M_2$ while waiting for $M_1$ at line 12, and $T_2$ is holding $M_1$ while waiting for $M_2$ at line 9 (the deadlock goal). The execution synthesis module 134 saves the required inputs for getchar( ) and getenv( ) along with the synthesized schedule (i.e., the one in which $T_1$ acquires $M_1$ and $M_2$, then releases $M_1$, then $T_2$ gets to run until it acquires $M_1$ and blocks on $M_2$, after which $T_1$ gets to run again and blocks on $M_1$).

Recall that the thread schedule synthesis module 310 identifies the longest common prefix of the final thread call stacks in the coredump and inserts preemptions only in executions whose call stacks contain this prefix (step 920 in FIG. 9). If the last frame of the common prefix corresponds to procedure p, then p is set as an intermediate goal for each thread. For the FIG. 10 example, p would be the entry into CriticalSection.

Below is an excerpt of a sample synthesized execution file that corresponds to the FIG. 10 actual bug example. The excerpt is simplified for clarity and written in plain text form. The program counters ("pc") are given as line numbers for the example in FIG. 10.
thread id=1, pc=1, getchar( ) return='m'
thread id=1, pc=1, getenv("mode") return="Yes"
thread id=1, pc=11, preemption before pc, next thread id=2
thread id=2, pc=9, preemption before pc, next thread id=1
thread id=1, pc=12, deadlock detected, deadlocked thread is {1,2}

Low-Overhead Bug Fingerprinting for Fast Debugging

Described above was an environment 100 for generating an execution of a software program that reaches a given failure point (e.g., a "bug"). In one embodiment, the environment 100 does not record anything during the production phase (e.g., at the time of a failure), instead using offline inference to determine how to make a failure play back deterministically. In another embodiment, some small bits of information are recorded during production and then used to speed up the inference process.

There is a gap between the information available at the time of a software failure and the information actually saved in the corresponding bug report. To close this gap, bug fingerprints are proposed—an augmentation of classic automated bug reports with runtime information about how the reported bug occurred in production. This runtime information can then be used to speed up the inference process (e.g., to speed up generating a program execution that causes the bug described by the bug report to manifest itself).

Classic automated bug reporting systems contain at most a coredump that describes the final manifestation of a bug. In contrast, bug fingerprints contain additional small amounts of highly relevant runtime information that helps understand how the bug occurred. These "fingerprints" can be used to speed up both manual and automated debugging. BFTS (Bug Fingerprint Tracking System) is a system for collecting such runtime information about deadlocks and including it in the corresponding bug reports.

Software debugging is time-consuming and labor-intensive, with most of the work going into understanding how the reported bug occurred in the field. For example, 70% of the concurrency bugs reported to Microsoft take days to months to fix. This labor-intensive aspect makes software debugging expensive.

A classic bug report contains at best a coredump that describes the final state of the failed application. State-of-the-art automated bug reporting systems, such as Windows Error Reporting (WER), produce a trimmed version of the coredump, which reduces the overhead and privacy problems of a full coredump. Most other software relies on users to provide a coredump and a description of how to manually reproduce the bug.

The absence of precise information about how the bug occurred in the field leads to incorrect diagnosis. Non-deterministic bugs are particularly hard to reproduce and diagnose, forcing developers to guess the cause of the failure based on the bug report. Since bug reports offer no runtime information about how the bug occurred, guessing often leads to incorrect fixes; e.g., one study reports that 30% of concurrency bugs are initially fixed incorrectly. Ideally, developers should not have to rely so much on guessing.

There do exist tools that help reduce guessing by employing full system record replay. However, they can incur runtime recording overheads that make them impractical for in-production use. Other approaches, such as execution synthesis, use post-factum analysis to eliminate completely the need for runtime recording. However, execution synthesis may involve substantial compute time at the developer's site.

The inherent trade-off between runtime recording overhead and the fidelity/ease of subsequently reproducing bugs forms a spectrum of solutions, with full system replay at one end, and execution synthesis at the other. This spectrum is still poorly understood, and an important question remains: which is the least amount of information that is practical to record at runtime, yet still makes it easy to diagnose bugs of a certain type.

Given a class of bugs, it is possible to record a small amount of bug-specific runtime information with negligible overhead, and this information can substantially improve debugging. Based on this observation, bug fingerprints are proposed, small additions to classic bug reports that contain highly relevant "breadcrumbs" of the execution in which the bug occurred. These breadcrumbs ease the reconstruction of the sequence of events that led to the failure.

This idea works for deadlocks, an important class of concurrency bugs. BFTS (Bug Fingerprint Tracking System) is a prototype deadlock fingerprinting system for C/C++ software that keeps track at runtime of each thread's lock set and the callstacks of the corresponding lock acquisitions. When a deadlock hangs the application, this information is added to the bug report.

Deadlock Fingerprints

Despite being frequent (e.g., 30% of the bugs reported are deadlocks), deadlock bug reports are scarce, because deadlocks do not produce a coredump. Instead, they render the application unresponsive. Normal users restart the application without submitting a bug report, while expert users may attach a debugger to the program and capture each thread's callstack. Systems such as WER can be used to create a coredump, but it is still hard to debug deadlocks based on this information that describes only the end state.

Deadlocks become straightforward to debug if we have information on how the program acquired every mutex involved in the deadlock. In particular, the callstacks of the calls that acquired mutexes held at the time of deadlock, together with the callstacks of the blocked mutex acquisitions, provide rich information about how the deadlock came about. Alas, the former type of callstack information is no longer available at the time of the deadlock, and so it does not appear in the coredump.

Fortunately, it is feasible to have this information in every bug report: First, the amount of information is small—typically one callstack per thread. Second, it can be maintained with low runtime overhead, because most programs use synchronization infrequently. As it turns out, even for lock-intensive programs BFTS incurs negligible overhead.

BFTS's deadlock fingerprints contain precisely this information. Regular deadlock bug reports contain callstacks, thread identifiers, and addresses of the mutexes that are requested—but not held—by the deadlocked threads. We call these the inner mutexes, corresponding to the innermost acquisition attempt in a nested locking sequence. Additionally, deadlock fingerprints contain callstack, thread id, and address information for the mutexes that are already held by the threads that deadlock. We call these the outer mutexes, because they correspond to the outer layers of the nested locking sequence. Outer mutex information must be collected at runtime, because the functions where the outer mutexes were acquired are likely to have already returned prior to the deadlock.

We illustrate deadlock fingerprints with the code in FIG. 13A, a simplified version of the global mutex implementation in SQLite, a widely used embedded database engine. The bug occurs when two threads execute sqlite3EnterMutex( ) concurrently. FIG. 13B shows the classic bug report, and FIG. 13C shows the deadlock fingerprint. FIG. 13A is a listing of pseudocode illustrating the global mutex implementation in SQLite. FIG. 13B is a bug report corresponding to the listing of pseudocode in FIG. 13A. FIG. 13C is a deadlock fingerprint corresponding to the listing of pseudocode in FIG. 13A according to one embodiment.

A regular bug report shows the final state of the deadlocked program: $t_1$ attempted to lock mutex $m_1$ at $pc_1$ and $t_2$ attempted to lock mutex $m_2$ at $pc_2$. The bug report does not explain how $t_1$ acquired $m_2$ and how $t_2$ acquired $m_1$, and this is not obvious, since there are several execution paths that can acquire mutexes $m_1$ and $m_2$.

The deadlock fingerprint (FIG. 13C) clarifies the sequence of events: $t_1$ acquired $m_2$ at $pc_2$ in a first call to sqlite3EnterMutex, and $t_2$ acquired $m_1$ at $pc_1$. This information indicates that, just after $t_1$ unlocked $m_1$ at $pc_3$ and before $t_1$ incremented the in Mutex variable, $t_2$ must have locked $m_1$ at $pc_1$ and read variable in Mutex, which still had the value 0. Thus, $t_2$ blocked waiting for $m_2$ at $pc_2$. Next, $t_1$ resumed, incremented in Mutex, called sqlite3EnterMutex the second time, and tried to acquire $m_1$ at $pc_1$. Since $m_1$ was held by $t_2$ and $m_2$ was held by $t_1$, the threads deadlocked. This is an example of how BFTS can help debug the deadlock and reveal the data race on in Mutex.

To acquire this added information, BFTS uses a lightweight instrumentation layer that intercepts the program's synchronization operations. It records the acquisition callstack for currently held mutexes in a per-thread event list. A deadlock detector is run whenever the application is deemed unresponsive, and it determines whether the cause is a deadlock.

The runtime monitor is designed to incur minimal overhead. A first design choice is to avoid contention at all costs, so each thread records the callstack information for its lock/unlock events in a thread-local private list. The private lists are merged solely when a deadlock is found (and thus the application threads are stuck anyway). This avoids introducing any additional runtime synchronization.

A second design choice is to trim the private lists and keep them to the minimum required size: every time a mutex is unlocked, BFTS finds the corresponding lock event in the list and discards it—mutexes that are no longer held cannot be involved in deadlocks. Thus, BFTS only keeps track of mutexes that have not yet been released, and so the size of a per-thread event list is bounded by the maximum nesting level of locking in the program.

As a result of this design, BFTS's runtime overhead is dominated by obtaining the call stack on each mutex acquisition. To reduce this overhead to a minimum, BFTS resolves call stack symbols offline, since this is expensive and need not be done at runtime.

The deadlock detection component of BFTS is activated when the user stops an application due to it being unresponsive. The detector processes each thread's list and creates a resource allocation graph (RAG) based on the events in the lists. The RAG contains a vertex for each active thread and mutex, and edges correspond to mutex acquisitions (or acquisition requests that have not succeeded yet). Edges are labeled with the thread id of the acquiring thread and the callstack corresponding to the lock operation. Once the RAG is constructed, the detector checks for cycles in the graph—a RAG cycle corresponds to a deadlock. If a deadlock is found, the detector assembles the corresponding fingerprint based on the callstacks and thread identifiers found on the cycle's edges.

In one embodiment, BFTS is implemented inside FreeBSD's libthr POSIX threads library. One advantage of recording fingerprints from within the existing threading library is the opportunity to leverage existing data structures. This embodiment added pointers to BFTS's data structures inside the library's own thread metadata structure. One optimization in BFTS is the use of preallocated buffers for storing the call stack of mutex acquisitions—this removes memory allocations from the critical path.

Generalizing Bug Fingerprinting

Bug fingerprints can be generalized to other kinds of bugs and used in automated debugging. A bug fingerprint serves to disambiguate executions: when faced with a bug report, a developer must find (guess) which of the many (often infinite) possible executions of the software could have led to the observed failure. The bug report provides clues for trimming down the set of possible executions, and the bug fingerprint should narrow it down to only a handful of possibilities. Fingerprint information must be small, to avoid undue recording overheads. Choosing what runtime information to include in a given fingerprint is therefore specific to each class of bugs. We illustrate this process with two examples: data races and unchecked function returns.

A bug fingerprint for a data race-induced failure contains information on the races that manifested during execution prior to the failure in the bug report. This way, it is possible to determine which potential data races influenced the execution and which did not.

An efficient data race fingerprinting system employs static analysis to determine offline, prior to execution, which memory accesses are potential data races. It then monitors at runtime only these accesses. There are two options to perform such monitoring with low overhead: debug registers and transactional memory. x86 debug registers can be configured to deliver an interrupt to a monitor thread whenever two memory accesses to the same address are not ordered by a happens-before relation and at least one of the access is a write (i.e., a data race occurred). The corresponding program counters and memory address are then saved for later inclusion in the bug report, should a failure occur. One drawback is that today's CPUs can monitor only a small set of addresses at a time, so debug registers can be used to watch only a subset of the statically-discovered potential races. An alternative approach is to use the conflict detection mechanism of transactional memory to detect data races, and record the fingerprint. If transactional memory features are available in hardware, this can be done quite efficiently.

Another interesting class of bugs appears in code that "forgets" to check all possible return values of a library function. For example, not checking whether a socket read( ) call returned −1 can lead to data loss (if caller continues as if all data was read) or even memory corruption (if return value is used as an index). For such unchecked-return bugs, the fingerprint contains (a) the program locations where a library function call's return value was not checked against all possible return values, and (b) the actual return value. Such fingerprinting can be done with low overhead by statically analyzing the program binary to determine the places in the program where library calls are not properly checked (e.g., using the LFI callsite analyzer), and monitoring at runtime only those locations.

For most bug types, a general solution is to incrementally record the execution index and include it in the bug fingerprint. The execution index is a precise way to identify a point in an execution and can be used to correlate points across multiple executions. Such a bug fingerprint can be used to reason with high accuracy about the path that the program took in production, but has typically high recording overhead (up to 42%). It is possible to reduce the overhead by recording only a partial execution index (e.g., by sampling) that, although less precise, can still offer clues for debugging.

It is practical to fingerprint any class of bugs, as long as the runtime information required to disambiguate possible executions that manifest the bug can be recorded efficiently. Fingerprinting mechanisms can leverage each other, so that collecting fingerprints for n classes of bugs at the same time is cheaper than n times the average individual cost.

Debugging Using Deadlock Fingerprints

Augmenting bug reports with bug fingerprints can substantially speed up debugging. For example, a developer debugging a deadlock can get from the deadlock fingerprint all mutexes involved in the deadlock and the callstacks corresponding to their acquisition calls. This allows the developer to insert breakpoints at all outer mutex locations and understand how the deadlock can occur.

Bug fingerprints are also an excellent aid for automated debuggers, like the environment 100 described above with reference to FIG. 1. The environment 100 is based on execution synthesis, an automated technique that starts from a bug report and finds an execution path and a thread schedule that reproduce the bug deterministically, with no human intervention. The technique employs a static analysis phase that proceeds backward from the coredump and identifies critical transitions that take the program to the state contained in the coredump. Then a forward symbolic execution phase searches for the necessary inputs and thread schedule to reproduce the bug.

Bug signatures can improve the efficiency of execution synthesis, since they help disambiguate between possible executions. The more execution paths appear to be likely to reach the end state contained in the coredump, the longer an execution synthesis-based debugger has to search. Bug signatures, however, contain clues that can substantially prune this search space.

For example, a major challenge in execution synthesis for deadlocks is identifying the thread schedule that leads to deadlock. BFTS's deadlock fingerprints narrow down the set of possible schedules, thus reducing search time. The combination of low-overhead bug fingerprinting with execution synthesis-style automated debugging improves the productivity of software developers.

Bug fingerprints are an augmentation of classic bug reports with runtime information about how the reported bug occurred. Fingerprints contain clues that substantially help in both manual and automated debugging. This approach can be extended to other types of bugs. Coupling bug fingerprints with automated debugging techniques (such as execution synthesis) can make debugging more efficient.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of generating an execution of a target software program that causes a particular bug to manifest itself, the method comprising:
receiving a target software program;
receiving a bug report generated by an execution of the target software program, wherein the bug report describes a particular bug within the target software program;
receiving a bug type of the particular bug; and generating a synthesized execution file that specifies an execution of the target software program that causes the particular bug to manifest itself, the generating comprising:
  determining a search goal based on the bug report;
  performing static analysis to narrow a search space of target program execution paths to the search goal, the static analysis comprising:
    computing an inter-procedural control flow graph of the target software program;
    determining critical edges of the inter-procedural control flow graph, a critical edge being an edge that must be followed by any execution path that reaches the search goal;
    determining one or more intermediate goals in the inter-procedural control flow graph, an intermediate goal being a block within the inter-procedural control flow graph that is guaranteed to be present in any execution path that reaches the search goal; and
    applying the intermediate goals to narrow the search space of target program execution paths to the search goal;
  performing dynamic analysis on the search space as narrowed by the static analysis, the dynamic analysis using symbolic execution to determine one target program execution path to the search goal from the narrowed search space;
  determining a conjunction of constraints along the one target program execution path; and
  solving the conjunction of constraints.

2. The computer-implemented method of claim 1, further comprising attaching a debugger to the target software program so that execution of the target software program according to the synthesized execution file can be analyzed.

3. The computer-implemented method of claim 1, further comprising:
  generating a modified bug report by attaching the synthesized execution file to the received bug report.

4. The computer-implemented method of claim 3, further comprising:
  comparing a first modified bug report with a first synthesized execution file to a second modified bug report with a second synthesized execution file;
  determining whether the first synthesized execution file is identical to the second synthesized execution file; and
  responsive to determining that the first synthesized execution file is identical to the second synthesized execution file, determining that the first modified bug report and the second modified bug report describe the same particular bug.

5. The computer-implemented method of claim 1, wherein the bug report includes a coredump, a stack trace, or a call stack.

6. The computer-implemented method of claim 1, wherein the bug type includes crash, deadlock, incorrect output value, or race condition.

7. The computer-implemented method of claim 1, wherein the synthesized execution file includes:
  a sequential execution path from a start of the target software program to a code portion of the target software program where the particular bug manifested itself; and
  an input to the target software program.

8. The computer-implemented method of claim 7, wherein the input to the target software program comprises a value for an argument or a parameter of the target software program.

9. The computer-implemented method of claim 7, wherein the input to the target software program comprises a return value from an operating system call made by the target software program.

10. The computer-implemented method of claim 7, wherein the target software program is multi-threaded, and wherein the synthesized execution file further includes:
  for each target program thread, a sequential execution path from the start of the target software program to the code portion of the target software program where the particular bug manifested itself; and
  a thread schedule for interleaving the thread-level sequential execution paths.

11. The computer-implemented method of claim 10, wherein the thread schedule includes a happens-before relation between specific target program instructions.

12. The computer-implemented method of claim 10, wherein the thread schedule includes a target program instruction on which a context should be switched and a switched thread identifier.

13. The computer-implemented method of claim 1,
  wherein the search goal comprises a tuple <B,C> wherein B is a code portion of the target software program where the particular bug manifested itself, and wherein C is a condition on target program state that was true when the particular bug manifested itself.

14. The computer-implemented method of claim 1, wherein the target software program is multi-threaded, and wherein generating the synthesized execution file further comprises:
  determining a thread schedule synthesis heuristic based on the bug type;
  scheduling execution paths of individual threads;
  preempting execution before and after synchronization operations and memory operations;
  forking execution at preemption points; and
  prioritizing thread schedules that are more likely to reproduce the particular bug.

15. The computer-implemented method of claim 1, wherein performing dynamic analysis comprises:
  applying a proximity heuristic to estimate a distance between each of a plurality of execution states and the search goal; and
  determining an execution state closest to the search goal.

16. A non-transitory computer-readable storage medium storing executable computer program instructions for generating an execution of a target software program that causes a particular bug to manifest itself, the instructions performing steps comprising:
  receiving a target software program;
  receiving a bug report generated by an execution of the target software program, wherein the bug report describes a particular bug within the target software program;
  receiving a bug type of the particular bug; and
  generating a synthesized execution file that specifies an execution of the target software program that causes the particular bug to manifest itself, the generating comprising:
    determining a search goal based on the bug report;
    performing static analysis to narrow a search space of target program execution paths to the search goal, the static analysis comprising:
      computing an inter-procedural control flow graph of the target software program;

determining critical edges of the inter-procedural control flow graph, a critical edge being an edge that must be followed by any execution path that reaches the search goal;

determining one or more intermediate goals in the inter-procedural control flow graph, an intermediate goal being a block within the inter-procedural control flow graph that is guaranteed to be present in any execution path that reaches the search goal; and applying the intermediate goals to narrow the search space of target program execution paths to the search goal;

performing dynamic analysis by using symbolic execution to determine one target program execution path to the search goal from the narrowed search space;

determining a conjunction of constraints along the one target program execution path; and solving the conjunction of constraints.

17. A computer system for generating an execution of a target software program that causes a particular bug to manifest itself, the computer system comprising:

at least one non-transitory computer-readable storage medium storing executable computer program instructions comprising instructions for:

receiving a target software program;

receiving a bug report generated by an execution of the target software program, wherein the bug report describes a particular bug within the target software program;

receiving a bug type of the particular bug; and generating a synthesized execution file that specifies an execution of the target software program that causes the particular bug to manifest itself, the generating comprising:

determining a search goal based on the bug report;

performing static analysis to narrow a search space of target program execution paths to the search goal, the static analysis comprising:

computing an inter-procedural control flow graph of the target software program;

determining critical edges of the inter-procedural control flow graph, a critical edge being an edge that must be followed by any execution path that reaches the search goal;

determining one or more intermediate goals in the inter-procedural control flow graph, an intermediate goal being a block within the inter-procedural control flow graph that is guaranteed to be present in any execution path that reaches the search goal; and applying the intermediate goals to narrow the search space of target program execution paths to the search goal;

performing dynamic analysis by using symbolic execution to determine one target program execution path to the search goal from the narrowed search space;

determining a conjunction of constraints along the one target program execution path; and solving the conjunction of constraints; and a processor for executing the computer program instructions.

* * * * *